US011412882B2

(12) United States Patent
Clark et al.

(10) Patent No.: US 11,412,882 B2
(45) Date of Patent: Aug. 16, 2022

(54) FUNNEL ASSEMBLY FOR MAKING POWDERED BEVERAGE

(71) Applicant: BUNN-O-MATIC CORPORATION, Springfield, IL (US)

(72) Inventors: Charles H. Clark, Springfield, IL (US); Jason M. Banning, Springfield, IL (US); Jane Ann Harris, Springfield, IL (US); William E. Midden, Springfield, IL (US); Laurie A. Owen, Springfield, IL (US); Jeff T. Samson, Boulder, CO (US)

(73) Assignee: Bunn-O-Matic Corporation, Springfield, IL (US)

( * ) Notice: Subject to any disclaimer, the term of this patent is extended or adjusted under 35 U.S.C. 154(b) by 52 days.

(21) Appl. No.: 16/804,583

(22) Filed: Feb. 28, 2020

(65) Prior Publication Data

US 2020/0196792 A1 Jun. 25, 2020

Related U.S. Application Data

(63) Continuation of application No. 15/457,646, filed on Mar. 13, 2017, now Pat. No. 10,646,065.

(60) Provisional application No. 62/384,793, filed on Sep. 8, 2016, provisional application No. 62/381,453, filed on Aug. 30, 2016, provisional application No. 62/308,081, filed on Mar. 14, 2016.

(51) Int. Cl.
*A47J 31/06* (2006.01)
*A47J 31/44* (2006.01)

(52) U.S. Cl.
CPC .............. *A47J 31/06* (2013.01); *A47J 31/44* (2013.01)

(58) Field of Classification Search
CPC .................................. A47J 31/06; A47J 31/44
USPC ........ 210/464, 470, 474, 476, 477, 479, 481
See application file for complete search history.

(56) References Cited

U.S. PATENT DOCUMENTS

| 5,913,962 | A | 6/1999 | Gasser |
| 6,103,116 | A | 8/2000 | Koslow |
| 7,464,638 | B2 | 12/2008 | Tremblay |
| 10,646,065 | B2 * | 5/2020 | Clark ................. A47J 31/06 |

(Continued)

OTHER PUBLICATIONS

U.S. Appl. No. 15/457,646, filed Mar. 13, 2017, Pending.

*Primary Examiner* — Madeline Gonzalez
(74) *Attorney, Agent, or Firm* — Barnes & Thornburg LLP

(57) ABSTRACT

The present disclosure relates to a method and apparatus for a funnel assembly for use in a beverage brewing apparatus. The funnel assembly may include an insert that is retained in the funnel assembly to contain a powdered or other similar substance for mixing with liquid within the insert. The insert is configured to extend within a cavity of the funnel assembly and is configured to permit mixing of the substance with the liquid before dispensing the mixture into a portion of the funnel assembly. The insert may include a rim or liquid shield, with at least a portion of the rim or liquid shield engaging a portion of the funnel assembly to retain the insert within the funnel assembly. The insert may further include a flow guide adjacent a drainage aperture, the flow guide at least partially directing the flow of mixture from the insert into a portion of the funnel assembly. The funnel assembly may alternatively itself be formed to contain a powdered or similar substance and permit mixing of the substance with liquid before dispensing.

23 Claims, 25 Drawing Sheets

(56) References Cited

U.S. PATENT DOCUMENTS

| | | | |
|---|---|---|---|
| 2003/0209151 A1* | 11/2003 | Mordini | A47J 31/06 99/323 |
| 2007/0039479 A1 | 2/2007 | Dalton et al. | |
| 2010/0199850 A1 | 8/2010 | Koopman et al. | |
| 2015/0296855 A1 | 10/2015 | Farris | |
| 2017/0042364 A1 | 2/2017 | Crarer et al. | |

* cited by examiner

FUNNEL ASSEMBLY FOR MAKING POWDERED BEVERAGE

CROSS REFERENCE TO RELATED APPLICATIONS

This application is a Continuation of U.S. patent application Ser. No. 15/457,646, filed Mar. 13, 2017, which claims the benefit of priority to U.S. Provisional Application No. 62/308,081, filed Mar. 14, 2016, U.S. Provisional Application No. 62/384,793, filed Sep. 8, 2016, and U.S. Provisional Application No. 62/381,453, filed Aug. 30, 2016. The disclosures set forth in the referenced applications are incorporated herein by reference in their entirety.

BACKGROUND

The present disclosure relates to a beverage preparation apparatus, such as brewers and components for combining a beverage making substance with a heated substance such as water to produce a beverage.

A variety of brewing equipment is available for brewing fresh tea and coffee beverages using fresh beverage brewing substances such as ground coffee or whole leaf or leaf particle tea. These brewers typically include a beverage brewing funnel assembly that can be selectively positioned on a beverage brewing machine. In this configuration, the brewing funnel assembly includes a funnel body that retains a filter, typically in the form of a disposable paper filter or a permanent filter made of another material that is more durable such as plastic or metal mesh. Beverage brewing substance is loaded into the filter of the funnel assembly and attached to the brewer.

Typically, the funnel includes a flange or a lip around an upper portion of the funnel body that can be mounted to the brewer by use of a pair of opposing channel structures, commonly referred to as "rails". Once the funnel flange is positioned between the brewer rails, the brewer can be activated to initiate the brewing process. Once activated, heated water is controllably dispensed into the funnel via an opening at least partially defined by the lip of the funnel body from the brewer. The heated water is dispensed to saturate the beverage brewing substance with heated water to extract the flavors of the beverage brewing substance, or desired flavors and characteristics of the resultant beverage. The heated water and beverage brewing substance is mixed within a cavity defined by the filter material. During the brewing process, brewed beverage seeps through the filter material and collects in a lower portion of the funnel below the filter material. A drain hole is provided in a lower portion of the funnel, either centrally or offset from the center. An optional channel may extend from the drain hole to direct the beverage substance to a certain position for dispensing into a container. A user then positions the container below the drain to collect the freshly brewed beverage flowing from the funnel.

Brewers as described above are generally well known, widely used, and distributed throughout the food service industry. These brewers may be located in institutional settings, convenience stores, offices, restaurants as well as other food service settings. This relatively large installed base of equipment results in a large number of users who know how to operate the equipment. These brewers are configured for brewing freshly brewed beverages from beverage brewing substances. However, these brewers typically cannot accommodate other beverage making substances such as powders or other non-brewing substances.

For example, it would be useful to use this type of brewing equipment to produce beverages from other substances such as powdered beverage substances. While a variety of machines are designed for making beverages from powder, they are typically machines specifically designed of use with powders. As an example, many of these machines have been created to dispense a portion of powder for mixing with heated water and blending using a mechanical whipping device. Common types of beverages produced using this type of equipment might include hot chocolate, coffee mocha beverages, latter, other dairy based, coffee based, combined dairy and coffee, as well as soup beverages or food products. All of these types of beverage products are served hot because of hot water mixed with the powdered beverage, thoroughly whipped in the machine, and dispensed into a container or single serving cup. All of these beverages or foods typically are compatible to a whipping action in the product since it is expected or at least acceptable that the product may include some degree of froth. All of these heated products benefit from the whipping to thoroughly dissolve or integrate the powdered beverage ingredients or material with water. This integration thoroughly combines the powdered components of the beverage or food product such as dried dairy ingredients, freeze dried coffee, as well as granular or finely powdered sugar.

A problem arises if a food or beverage product is not conducive to whipping or is not served as a hot beverage or food. For example, the production of fruit-based beverages is typically served chilled or cooled. It would not be conducive to the production of such a beverage to use hot water to make the beverage to dissolve the flavor and sugar components in the final beverage. Additionally, such beverages are typically not served in a whipped condition. For example, if a portion or a large multi-serving container of lemonade were to be produced it would be desirable to produce the lemonade in a chilled or at least reduced temperature state. Furthermore, it is not desirable to have a whipped or frothed portion of the resultant juice-type beverage.

SUMMARY

For the foregoing reasons, it would be beneficial to develop a beverage making system that can utilize components of numerous installed and well understood beverage brewers to produce non-brewed beverages. Furthermore, it would be beneficial to use existing beverage making equipment to produce beverages that are not conducive to whipping or other mechanical mixing and integration of ingredients. It would be beneficial to develop apparatus and processes for utilizing known beverage making substances such as powdered juice or other beverages to be served at ambient or reduced temperatures using the general principles of known beverage making equipment.

BRIEF DESCRIPTION OF THE DRAWINGS

The present disclosure will be described hereafter with reference to the attached drawings which are given as a non-limiting example only, in which.

DETAILED DESCRIPTION

Figure 1:
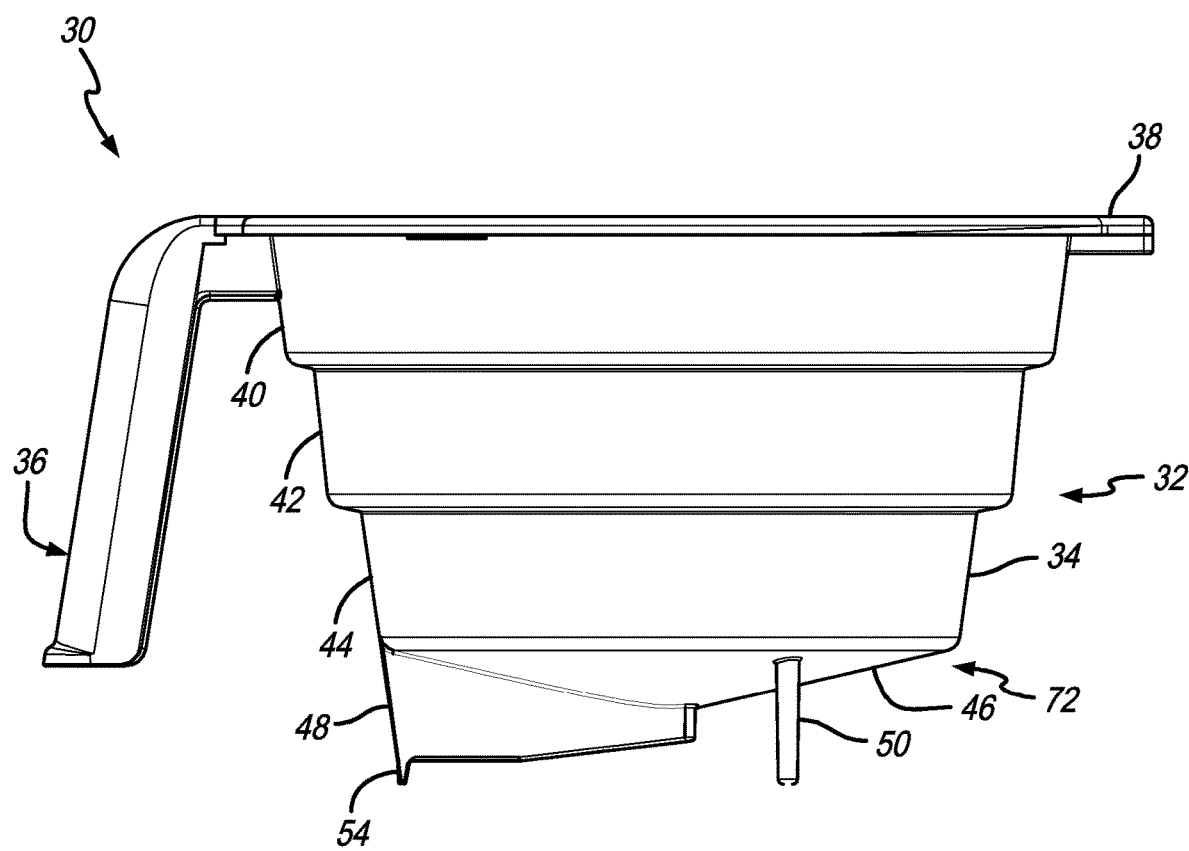
FIG. 1 is a side elevational view of a brewing funnel assembly for use with an exemplary beverage brewing apparatus, and although the specific apparatus is not shown, this funnel assembly can be used with a beverage brewing apparatus for producing iced tea, including an offset outlet portion and a partially conical wall defining a cavity therein.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

Figure 4:
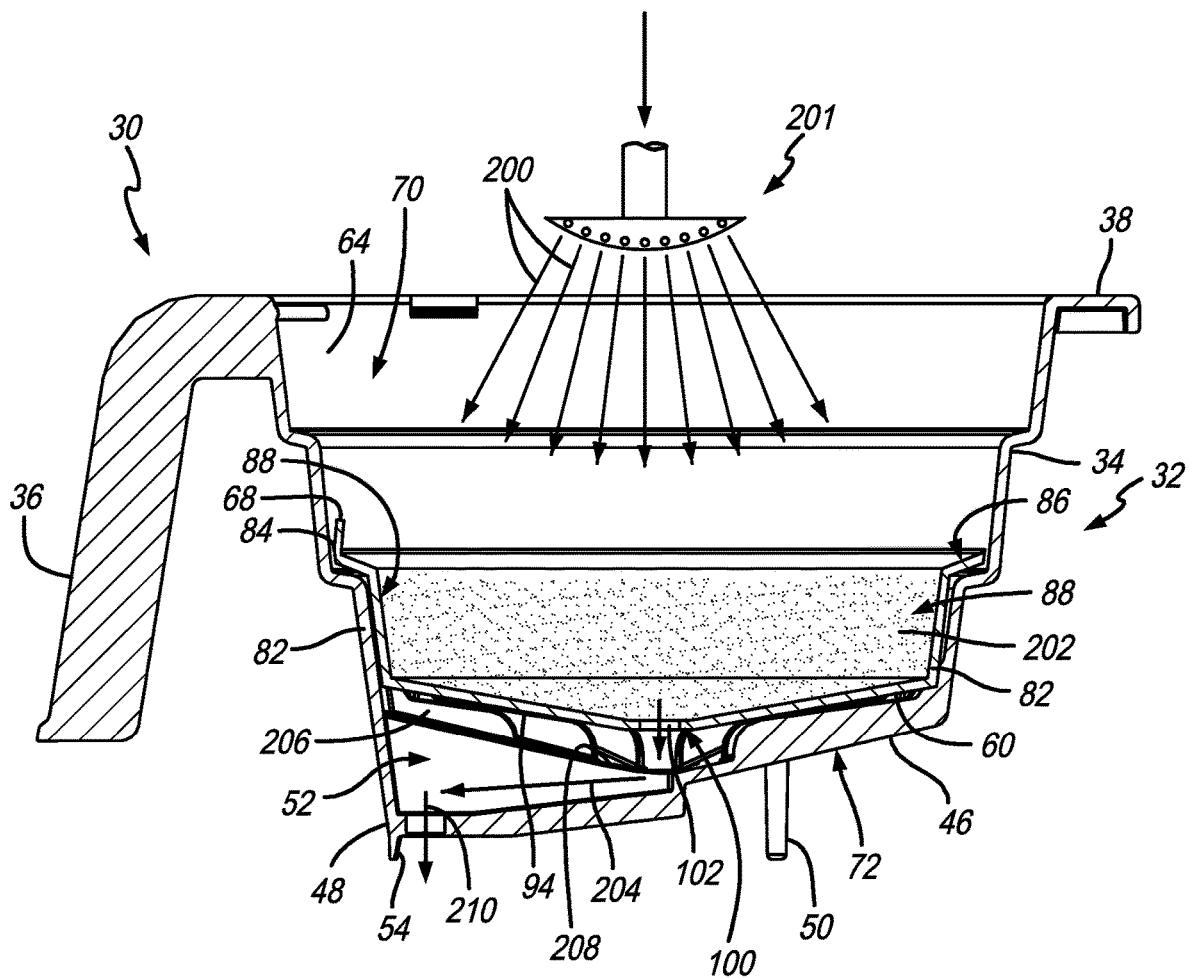
FIG. 4 is a cross-sectional side elevational view of the funnel assembly as shown in FIGS. 1 and 2 showing a cross section through a portion of the insert as shown in FIG. 3, generally indicating the combination of heated water from the beverage making apparatus combining with powdered or at least partially-granular material used to produce the flavors and other characteristics of the beverage when combined with the water, and showing the outflow of freshly produced beverage from and through the drain opening and exiting the funnel through the offset outlet portion.

With reference to the figures, FIG. 1 shows a side elevational view of a funnel assembly 30 that can be used to produce a brewed beverage. The funnel assembly includes a body portion 32 primarily composed of a wall 34, a handle 36 attached to and extending from the wall 34 with a rim or flange 38 positioned at a top portion of the wall 34. As shown, the funnel body 32 has a wall with a stepped (40, 42, 44) structure and a bottom portion 46 connected to the wall 34. Other forms of the funnel body 32 are envisioned herein. An offset outlet structure 48 is attached to and extending from the bottom portion 46. The offset outlet structure 48 forms a slot 52 accessible from an interior cavity 70 of the funnel 30, as illustrated in FIG. 4. One or more support legs 50 are attached to the bottom to support the funnel in an upright condition when placed on a generally horizontal surface. Similarly, a support post 54 may extend below the offset outlet structure 48 to work in conjunction with the one or more support legs 50 to support the funnel assembly 30 on a horizontal surface.

It should be noted that while a particular style of brewing funnel is shown in the figures, a variety of configurations could be used to achieve the same or substantially similar results as described in this detailed description. A variety of funnel body structures and other configurations can be used to achieve substantially the same results in substantially the same way based on the teachings of the description. Applicant intends that the drawings will provide illustration of the general principles but will not limit the application of those principles to specific configurations, materials, dimensions or other limitations. Rather, the intent of this application is to broadly disclose and claim the structural and functional concepts set forth herein. As an example, while a stepped (40, 42, 44) configuration is shown the wall 34 could be generally continuous without the steps and the funnel body might be configured without a specifically defined base or floor, with the wall transitioning into a lower area with no specific floor portion.

Figure 2:
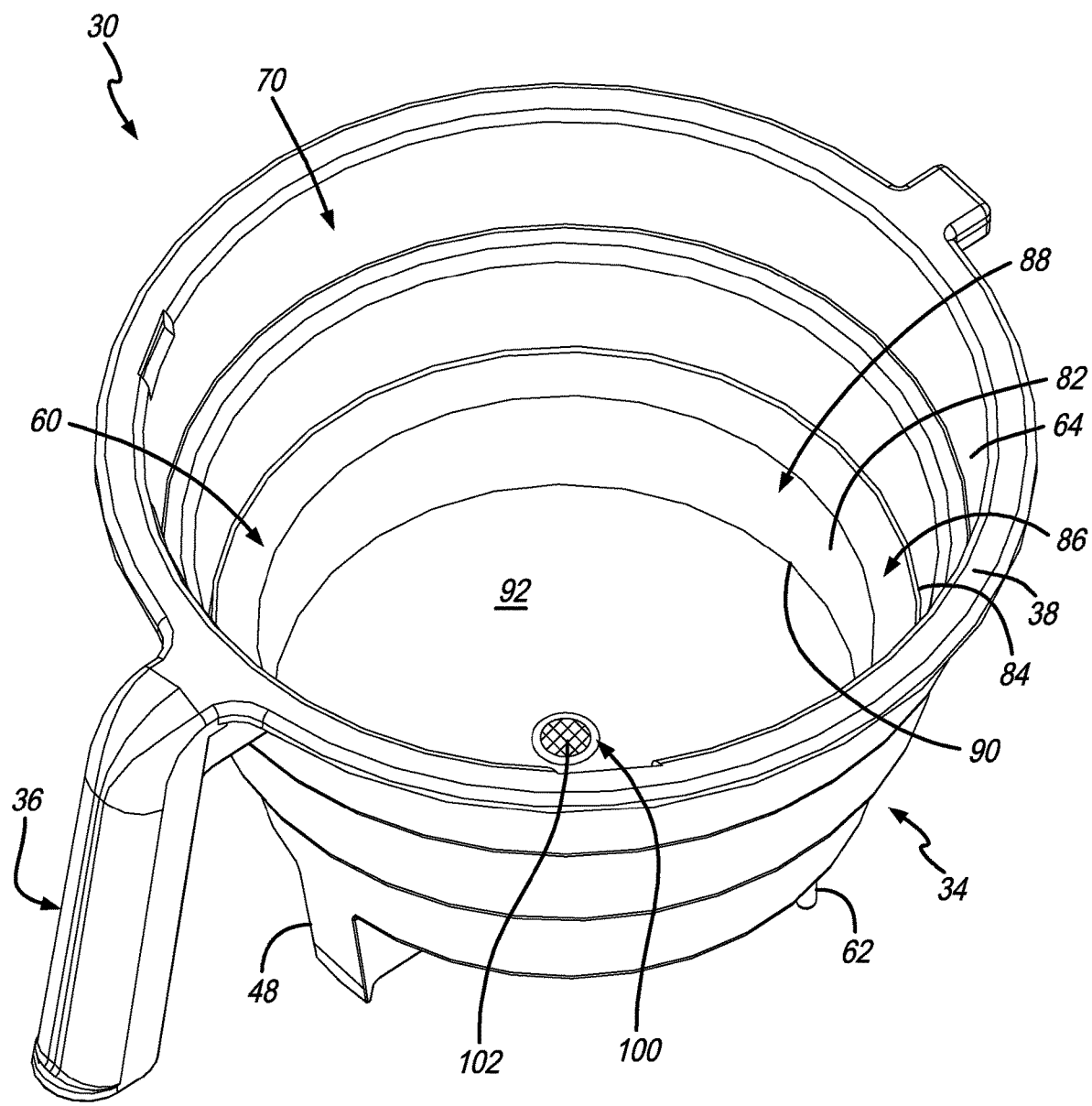
FIG. 2 is a top perspective view of the funnel assembly shown in FIG. 1 that has been rotated slightly to show interior portions of a funnel body, revealing a cavity defined by a surrounding wall, and including an exemplary embodiment of a powdered beverage making insert positioned within the cavity.

With regard to FIG. 2, an internal perspective view of the funnel 30 is shown and the funnel has been rotated from FIG. 1 to show the internal structures and configuration of the funnel. For example, FIG. 2 illustrates an insert 60 positioned in the funnel body 32. As noted, the funnel body 32 includes a rim or flange 38 positioned at the top edge of the wall 34. The handle 36 is generally shown attached to and extending from the wall 34 at a position towards the flange 38. The specific configuration of the handle is provided for purposes of illustrating the present concepts. The handle is not required to be in this position but could be positioned elsewhere or otherwise attached to or integrated with the wall 34 or other structures of the funnel 30. Alternatively, there may be no handle on the funnel assembly 30. The wall 34 includes an outside surface 62 and an inside surface 64. In certain embodiments, the insert 60 is configured to engage or at least abut or lie against a corresponding portion of the inside surface 64 of the wall 34. The insert 60 is positioned in the interior cavity 70 of the funnel 30 defined by the inside surface 64 of the wall 34 at or generally below the rim or flange 38. In certain embodiments, the insert 60 occupies a lower portion of the cavity 70 covering structures in a lower portion 72 of the funnel body 32.

Figure 3:
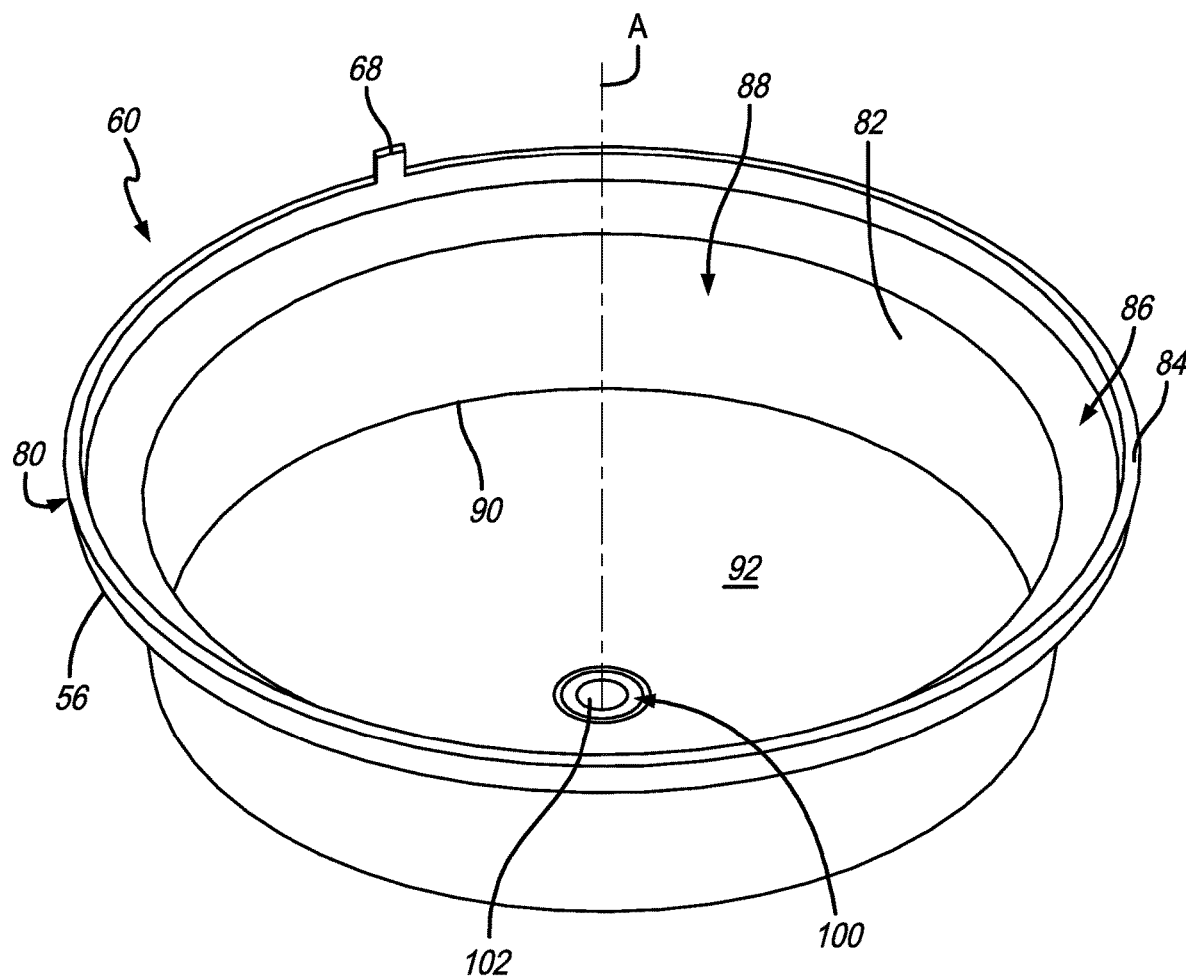
FIG. 3 is an enlarged perspective view of the insert of FIG. 2 removed from the funnel body and illustrating a side wall of the insert that is generally configured for engagement with the funnel body, a rim at a top edge of the side wall defining a mouth that provides access to a beverage making basin defining a volume used for combining water and at least partially-powdered or pulverized beverage making substance, a drain hole provided in a floor of the insert, and a mesh or other grate or other flow-restricting and particle-retaining structure in or at least overlying the drain hole.

FIG. 3 shows an enlarged perspective view of the insert 60 removed from the lower portion 72 of the funnel body 32. Generally, the insert 60 is compatibly sized and dimensioned, and configured for positioning in the lower portion 72 of the funnel body 32 to provide a relatively close fit between an outside surface or at least a portion of the surface 80 of the insert 60 with a corresponding inside surface 64 of the funnel body 32. However, the insert 60 need not be compatibly sized to the funnel body 32 or form a close fit between an exterior surface 80 of the insert 60 and the inside surface 64 of the funnel body 32. Accordingly, various relationships between the size and configuration of the insert 60 and the inside of the funnel body 32 are envisioned here.

The insert 60 includes a wall 82 with an upper portion 56 defining an insert rim 84. The rim 84 defines the boundary of an insert mouth 86 with an insert volume or void 88 defined within the boundaries of the wall 82 and rim 84. The insert 60 includes a base 92, wherein the insert 60 essentially defines a basin that is capable of retaining material in the base 92. While the insert 60 shown in FIG. 3 has a generally circular configuration with the wall 82 terminating at a lower end 90 adjoining the base 92 of the insert 60, other shapes, geometries and configurations of the insert 60 can be produced and use for correspondingly formed funnel bodies. The base 92 of the insert 60 may be angled radially downward such that the lowest portion of the insert 60 corresponds with a central axis A. Generally, the shape of the insert is configured to be at least partially compatible with a corresponding funnel body 32. The rim 84 of the insert 60 may be configured to engage with or abut against a stepped surface 66 of the wall 34 of the funnel body 32, as illustrated in FIG. 4. The base 92 of the insert 60 may include a smooth top surface to permit the free-flow of fluids and other materials within the insert 60 during mixing.

As will be described, the function of the insert 60 is to retain a quantity of powdered, particulate, granulated, or other beverage material for dilution, dissolving, melting or otherwise combination with water, for example, heated water (although any type of liquid is envisioned herein). The insert basin 60 includes a drain aperture 100, illustratively formed in the base 92, that permits liquid to drain through the insert 60 and into the slot 52 formed in the offset outlet structure 48 of the funnel assembly 30 to be dispersed therefrom.

The term beverage as may be used herein is intended to be defined as including for purposes of illustration but not limitation the making of fruit juice based drinks, sweetener and flavor based drinks, and lemonade or other "-ade" drinks. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified.

Beverage powder or ingredients will be described in the present application and will be generally referred to as fruit based drinks or lemonade. However, it will be understood that the term beverage ingredient should be broadly interpreted regardless of reference to beverage ingredient. In addition, the characteristics or form of the beverage ingredient can be any variety of ingredients, which are currently known or hereafter developed. The form of the beverage ingredient may include powder, liquid, gel, crystal, flake, freeze-dried and any other form or state regardless of temperature, phase, or other characteristics. Reference to beverage dispensing includes reconstituting, brewing, steeping, or any other form of combining a dilution ingredient with a beverage ingredient using the concepts of the present disclosure.

Moreover, while "beverage" is referred to, it is envisioned that any variety of food ingredients could be placed in an ingredient container to reconstitute a desired food. In this regard, the food could take the form of juice, coffee, tea, other flavored beverages, as well as other foods such a soup. Furthermore, use of a dilution ingredient is to be broadly interpreted. While "water" is referred to for convenience and purposes of illustration but not limitation throughout the disclosure, it should be understood that any variety of dilution ingredients could be used with the present disclosure.

The drain aperture 100 is positioned in a location to access the inside of the cavity 88 of the insert 60. In illustrative embodiments, the drain aperture 100 is in a position that is or can be configured to be the lowest portion of the insert 60. As shown in FIGS. 2-6, the drain aperture 100 may be positioned generally centrally in the bottom 92 or floor of the insert 60 along a central axis A of the insert 60. In other configurations and as described below, the aperture 100 could be offset from the center, positioned along a side, or in other locations as needed. Generally, the location of the drain opening 100 of the insert 60 is configured to provide an outlet through which the combined beverage making substance and water can flow after the beverage making substance is dissolved or at least partially integrated with the water.

In certain embodiments, a mesh material 102 may be positioned over the drain aperture 100. The mesh 102 can be attached to or molded in the material forming the basin 60 to retain it in position over the drain aperture 100. While the mesh or other material 102 could be configured to be removable, a preferred embodiment is to integrally mold the mesh 102 in the basin 60 material so that it can be, generally, permanently retained in the basin 60. The material 102 is described as mesh but can be any variety of configuration of material (for example wire material) that permits a dissolved beverage making substance in the water to flow through the drain aperture 100. In this regard, during the beverage making process, the beverage making material has become at least partially dissolved and fluid in nature, allowing it to flow in solution with the water through the mesh material 102 and drain aperture 100.

In various embodiments, the drain aperture 100 and mesh 102 are configured to allow fluids to pass therethrough but are sized and dimensioned to provide some restriction of particles and fluids there through. In addition, the openings formed in the mesh or grate material are sized and dimensioned to prohibit larger particles of the beverage making substance from flowing through the mesh (e.g. undissolved clumps of material). This helps promote the substantial integration of the beverage making substance ingredients into the water. The beverage making substance might be formed of ingredients including a sugar material or other natural, synthetic, or a combination of sweeteners and may include coloring ingredients, flavoring ingredients, sweetening ingredients and other ingredients providing other flavors or beverage characteristics. An ingredient may be included to provide a particular mouth feel of the resultant beverage once the ingredients have been mixed in the water.

The insert 60 is formed of a material that is compatible for use with food products. The materials can be chosen for its qualities in relation to the type of beverage making substance ingredients that will come in contact with the material surfaces. Additionally, the material can be chosen for its properties relative to the use and contact with hot water. The beverage making equipment that is used to produce this beverage typically will dispense liquid such as hot water into the basin. The hot water provides a preferred chemical reaction to dissolve, melt, or otherwise break down the beverage making substance materials to dissolve it and carry it in the water, or in other words suspend or integrate the beverage ingredients in solution. It is a generally well-known chemical principal that heated water has a greater capacity to maintain other ingredients in solution. As such, the preferred material could be selected for its food grade properties under these various conditions. One example of a possible material would be silicone that is suitable for use in such a food preparation environment. In addition, it could be preferred to provide an insert material that generally does not retain flavor or color characteristics from batch to batch. This will help prevent flavor or color transfer from altering the desired resultant beverage results.

Figure 5:
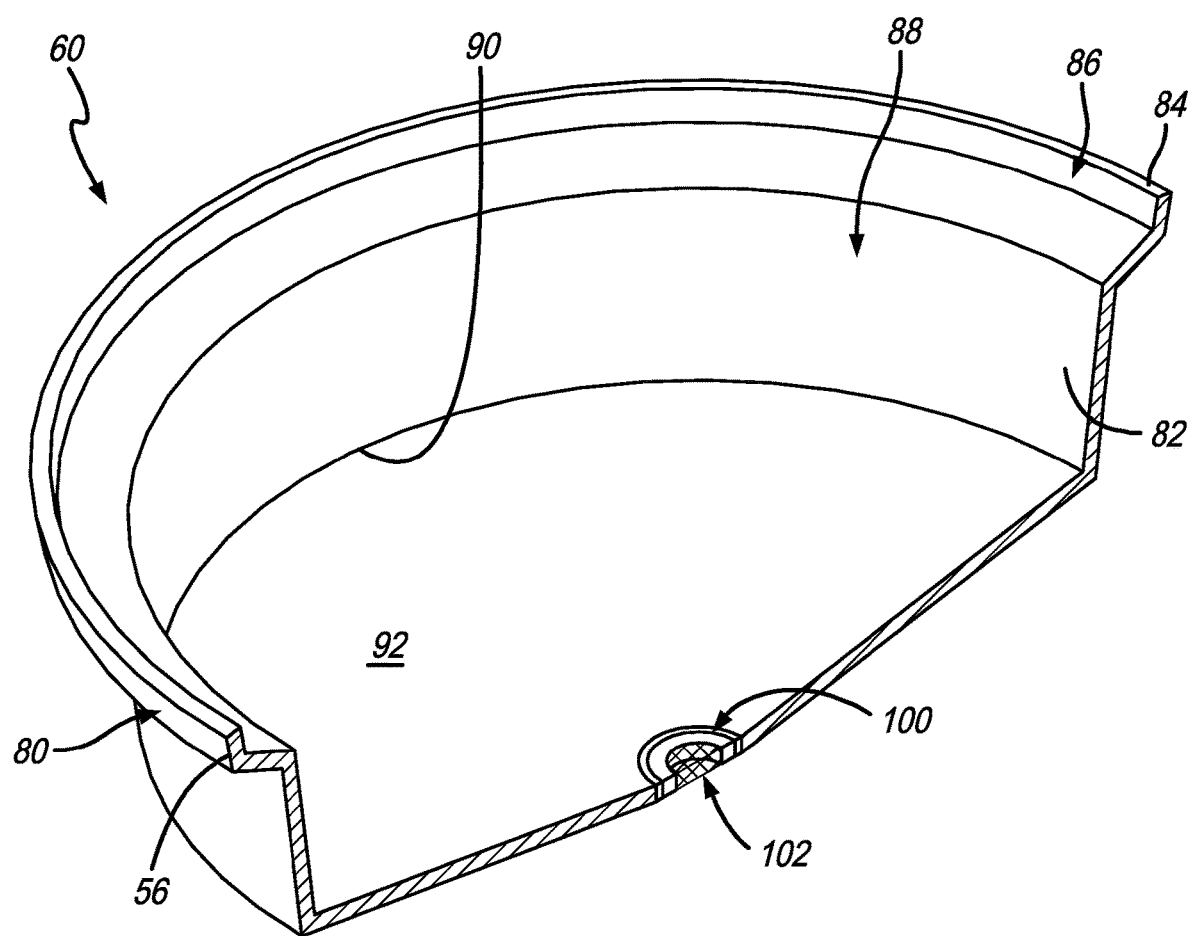
FIG. 5 is an enlarged cross sectional perspective view of the insert removed from FIG. 4.
Figure 6:
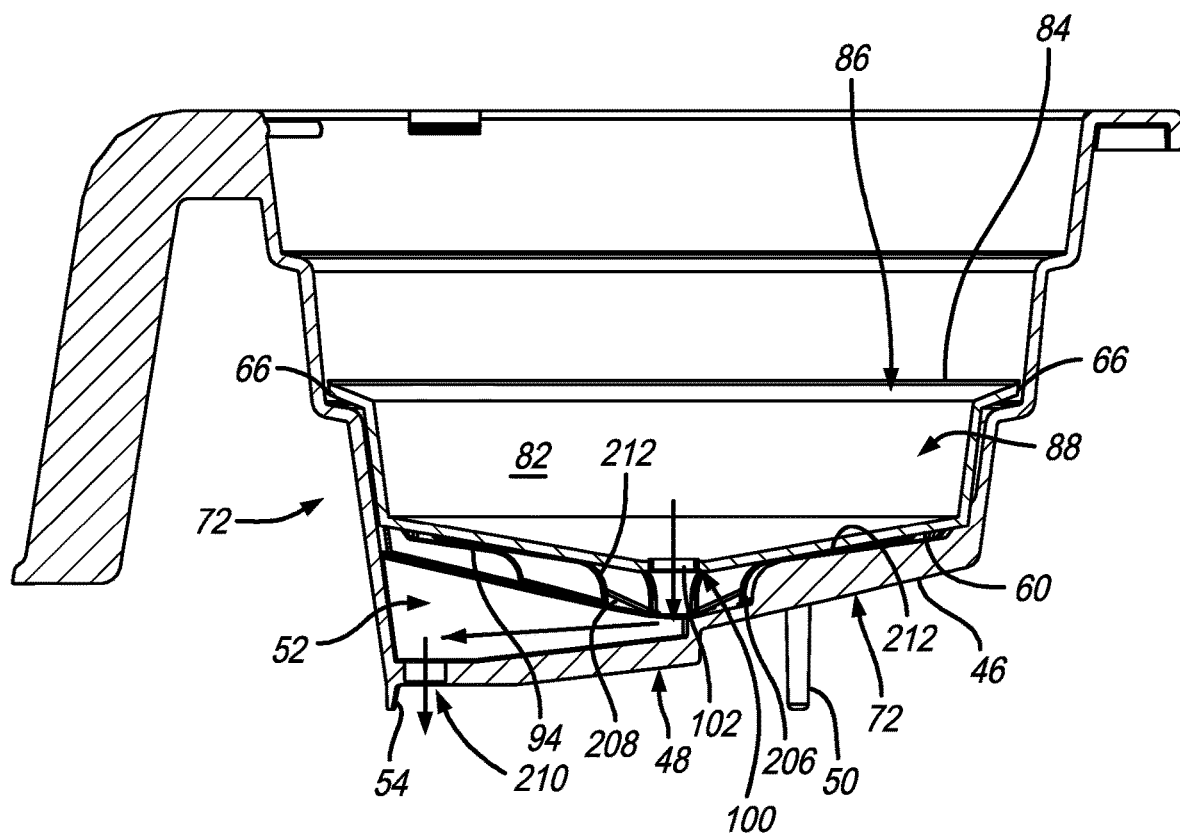
FIG. 6 is a view similar to the cross section shown in FIG. 4 showing the insert on top of and covering ribs extending from a floor of the funnel body, the insert preventing the retention or trapping of powdered material in areas such as the intersection of the rib and funnel floor which might otherwise trap some of these particles, wherein the trapped particles may possibly combine with the next batch of tea or other beverage being produced that is not intended to have the flavor of the previously produced beverage, for example lemonade, and thereby preventing flavor crossover.

Turning to FIGS. 4, 5 and 6, a cross sectional view of the funnel 30 including the insert 60 retained therein is shown in FIG. 4, with an enlarged view of a cross section of the insert 60 being shown in FIG. 5 and a similar insert 60 shown in cross section, but enlarged, in FIG. 6. FIG. 4 includes a diagrammatic illustration of a spray head 201 of a beverage maker to distribute water 200 over a quantity of beverage making substance 202 to combine with the substance 202 to produce a beverage solution 204. The beverage solution 204 drains through the drain aperture 100 and the grate material 102 retained therein.

The beverage solution 204 drains through the structures and can flow around, or bypass altogether, portions of one or more ribs 206 in the bottom of the funnel body 32. The ribs 206 are provided on the inside of the funnel body 32 to support a filter material lining the inside of the funnel body 32 and typically used to contain a beverage brewing substance such a coffee or tea. When used with coffee or tea the coffee or tea seeps or flow out through the filter material retained on top of the ribs and drains into channels 208 defined between spaced apart neighboring ribs 206. The ribs support the filter material even when saturated with beverage and water and the channels 208 allow for a beverage to flow from below the filter material and out through the funnel drain 210 extending through the offset outlet structure 48.

The insert 60 provides the advantage of retaining the powdered beverage making substance in the basin or cavity 88 of the insert for 60 mixing with water to dissolve it and form a liquid beverage or liquid beverage making ingredient. If the powdered substance was placed directly into the funnel without the insert 60, portions or particles of this substance might become attached in untended areas, stuck to the inside surfaces of the funnel body, or lodged in areas such as the intersection between a rib 206, wall, and an inside surface of a funnel bottom in the channel areas 208. This entrapment of beverage making substance particles could be undesirable since it could transfer flavor, coloration, or other characteristics to the next batch of beverage made in the funnel. Additionally, if this material is entrapped on the funnel surface (when not using the insert 60) it could attract or promote undesired organisms that could grow on the remaining nutritional components of the particles. For example, if the beverage making substance includes sugar or other organic flavorings this material could provide a food source for the growth of such organisms. Therefore, the use of the insert 60 eliminates or at least reduces particles being trapped in the funnel thereby preventing the development of undesirable organisms.

In various embodiments, the insert 60 may be positioned to abut against or engage with the ribs 206 of the funnel body 32. For instance, the bottom surface 94 of the insert 60 may abut or engage with a top surface 212 of each rib 206, as illustrated in FIG. 6. The shape of the bottom surface 94 of the insert 60 may mirror or correspond with a shape of the top surfaces 212 of the ribs 206. Alternatively, the insert 60 may be positioned in the funnel body 32 such that the bottom surface 94 of the insert 60 may be spaced away from the top surfaces 212 of the ribs 206.

Figure 7:
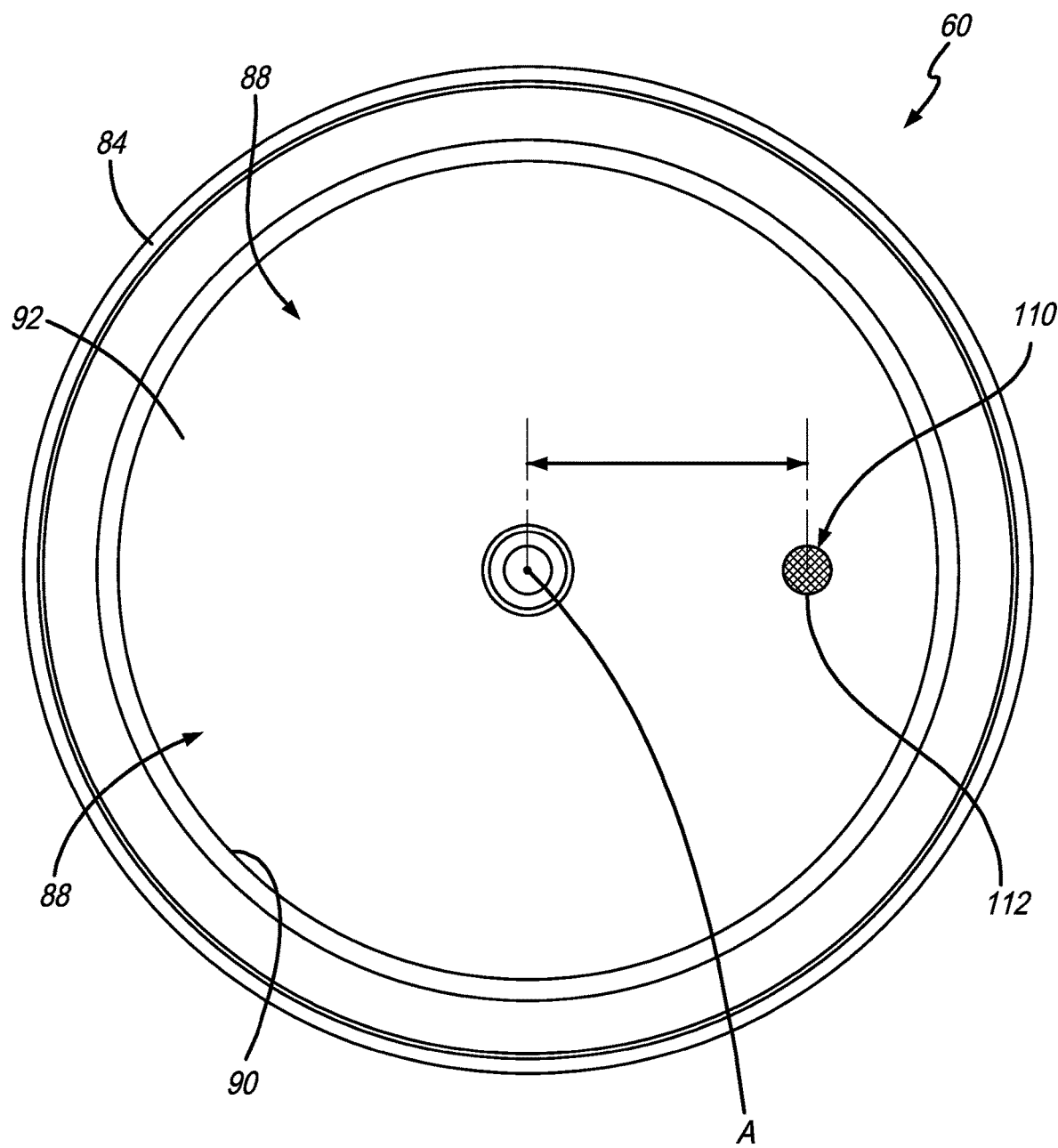
FIG. 7 is a top perspective view of an alternative exemplary embodiment of a powdered beverage making insert and illustrating the insert includes an off-set drain hole in a floor of the insert, with a mess or other grate/flow restricting structure in or overlying the off-set drain hole.
Figure 8:
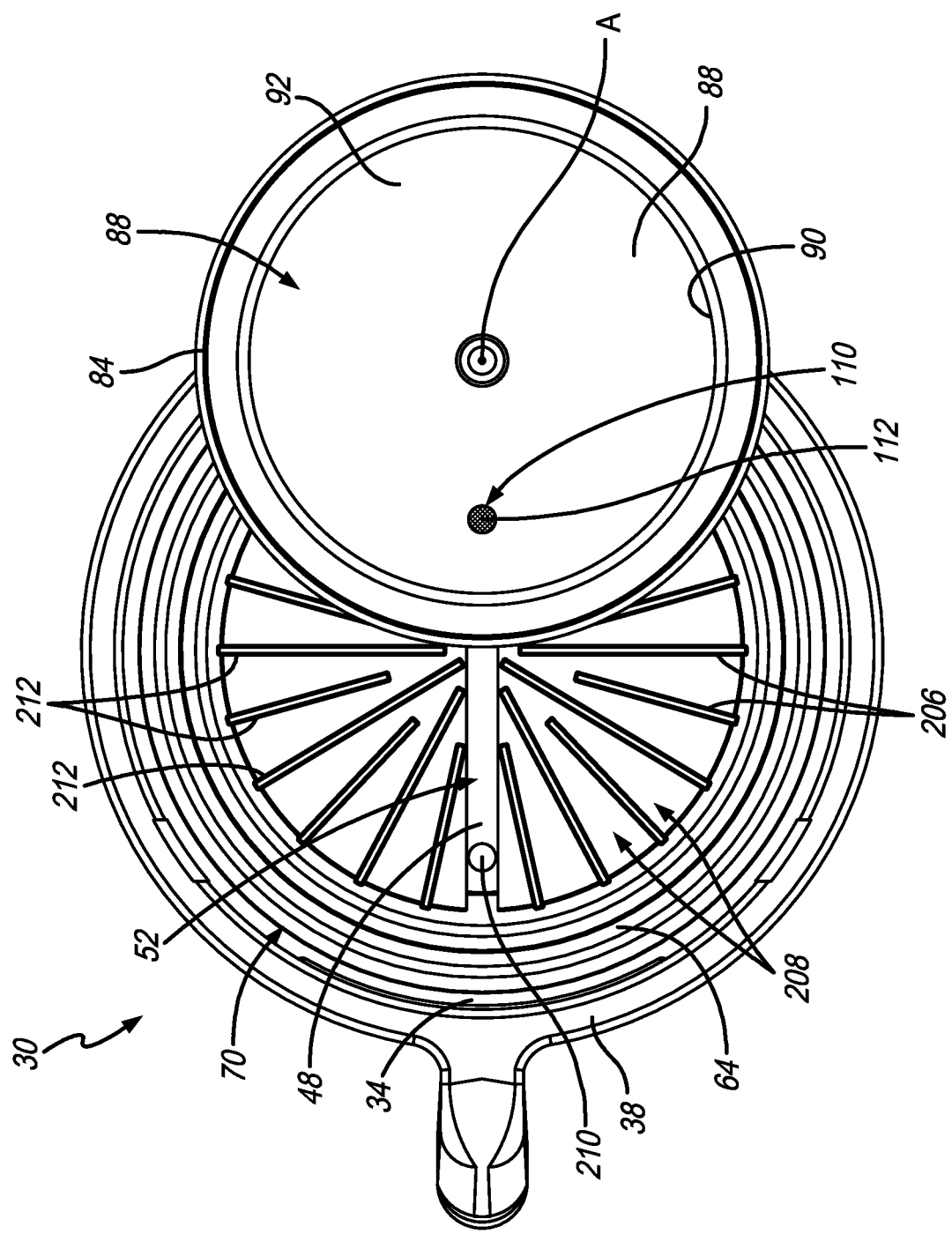
FIG. 8 is a top perspective view of the insert of FIG. 7 being received within a funnel body and illustrating that the off-set drain hole can be configured to be positioned over a channel of an offset outlet structure of the funnel body configured to direct liquid out of the funnel assembly.

In illustrative embodiments, the insert 60 may alternatively or optionally include an offset drainage aperture 110 positioned in a location that is annularly outward of the central axis A of the insert 60, as illustrated in FIGS. 7-8. In various embodiments, the offset drainage aperture 110 may be formed similar to the drainage aperture 100 and include a mesh or grate material 112 that extends through the offset aperture 110 and is otherwise molded or attached to the base 92 of the insert 60. In various embodiments, the mesh material 112 may be formed with the base 92 as described above with regard to mesh material 102. As the base 92 of the insert 60 may be angled downward such that the lowest portion of the insert 60 corresponds with the central axis A, the offset drainage aperture 110 may be positioned above the lowest portion of the insert 60 and would permit draining of fluids from the insert 60 if the fluids were pooled to at least the location of the offset drainage aperture 110. In various embodiments, the offset drainage aperture 110 may be positioned approximately half-way between the central axis A and the wall 82 of the insert 60. In other embodiments, the offset drainage aperture 110 may be positioned closer to the wall 82 than the central axis A of the insert 60. Other relative locations are envisioned herein for the offset drainage aperture 110.

In various embodiments, the insert 60 includes only the offset drainage aperture 110 and does not include the drainage aperture 100 that is positioned along the central axis A of the insert 60. As the offset drainage aperture 110 will be located along a portion of the base 92 that is angled, water or other liquid will naturally run towards the lowest point of the base 92, which may be adjacent the central axis A. Accordingly, as powder sits in or around the offset drainage aperture 110, the powder will be subjected to more "sluicing" action from the liquid being drawn downward down the central axis A. Contrarily, any powder in the lowest portion of the base 92 may experience a pooling effect, wherein water or other liquid simply pools above and around the powder instead of washing it along the angled portion of the base 92. In such a manner, any powder that is located adjacent the offset drainage aperture 110 may receive more thorough mixing and agitation or incorporation of the dry product into the liquid.

The offset drainage opening 110 may be positioned to drain liquid into the slot 52 of the offset outlet structure 48 of the funnel assembly 30, as illustrated in FIG. 8 (thereby bypassing any substantial interaction of the liquid with the ribs 206 on the base 92 of the funnel body 32). In various embodiments when the insert 60 is circular, visible or raised arrows may be used on the insert 60 and the funnel assembly 30 in order to ensure that a user "clocks" the insert 60 properly to position the offset opening 110 of the insert 60 above the slot 52. Alternatively, a bottom surface 94 of the insert 60 may be configured with one or more mating structures (not shown) that mate with the ribs 206, the channels 208, the slot 52, or another portion of the bottom of the funnel assembly 30 in order to ensure that the offset drainage opening 110 of the insert 60 is positioned above the slot 52 to drain liquid into the slot 52 and out of the funnel assembly 30.

In various embodiments, the insert 60 includes two openings that extend therethrough, the drainage aperture 100 and the offset drainage aperture 110, in order to help avoid pooling and create more agitation and mixing action to reduce or eliminate any powder or dry remnant. In various embodiments, each drainage aperture 100/110 may or may not have a mesh screen 102/112. In other embodiments, the insert 60 may include multiple openings, such as three or more. The number, shape, size, location and inclusion of mesh screens for each of drainage aperture may be used to maximize control and influence over the liquid motion during a brewing or mixing operation to avoid pooling, create sluicing, and/or maximize incorporation of all powder in the finished beverage.

In use, a beverage making apparatus can be used to produce a beverage which may not include freshly ground coffee or tea particles but may be comprised primarily of one or more ingredients including powders, flavorings, sweeteners, colorants, aroma ingredients, ingredients to produce a desired texture, as well as other ingredients to produce a resultant beverage. An insert 60 may be produced to fit in a relatively conforming configuration with an inside surface of the funnel body used with this beverage making equipment. When making a batch of beverage using a powdered or granular material, the insert 60 is placed in the cavity of the brewing funnel and positioned in the funnel body 32. Once positioned and retained, the beverage making substance can be placed in the cavity 88 of the insert 60. The funnel is positioned in the brewer for receiving water 200 from a spray head 201. Once the water contacts the beverage making substance, the substance tends to become dissolved in this water and resulting ingredient mixture. The liquid portion of the dissolved beverage ingredient and water 204 flows out of the insert 60 through a drain opening 100/110, and mesh or grate material 102/112, and flows out through the funnel drain 210.

In various embodiments and as seen in FIGS. 3 and 4, the insert 60 may further include one or more tabs or handles 68 adjacent the insert rim 84 and coupled to a portion of the insert 60, for instance, the upper portion 56. The tabs 68 may be co-molded with the insert 60 and extend upward toward the flange of the funnel assembly 30 within the cavity 70 of the funnel assembly 30 and about the insert mouth 86. The tabs 68 may be positioned such that the do not engage with or abut against the inside surface 64 of the wall 34 of the funnel assembly 30, in order to provide a clearance area for a user to grasp the tabs 68. The tabs 68 may be configured to provide assistance to a user when lifting the insert 60 in and out of the funnel assembly 30, particularly when the surface 80 of the insert 60 abuts against or is in frictional engagement with the corresponding inside surface 64 of the funnel body 32.

In various embodiments, the insert 60 may further be modified to optimize a filter-less tea or coffee brewing operation, as is known in the industry. Further, one or more ribs may extend from the base 92 of the insert 60 upward into the cavity 88 of the insert 60 to retain a filter within the insert 60. Other forms of modifying insert 60 to permit production of various beverages or liquids are envisioned within the scope of this disclosure.

In one preferred configuration, the volume of the cavity 88 of the insert 60 is sized and dimensioned to receive the volume of beverage making substance for producing a batch of beverage. The volume should be compatible also to receive at least a portion of the water to be used in the mixing and dissolving of the beverage making substance generally to retain the entire volume of the mixture within the cavity 88 of the insert 60 during the beverage making process. During one embodiment of the beverage making process, a separate quantity of water can be controllably dispensed by the beverage making apparatus into the receiving container. In other words, the receiving container positioned under the funnel outlet 210 receives the liquid beverage ingredients 204 from the funnel assembly as well as a separate volume of dilution water for mixing with the beverage ingredients 204. The dilution water can be at ambient or reduced temperature to help promote the cooling of the beverage produced with the insert. As such, the use of multiple doses of water for different purposes during this beverage making process can be optimized to produce a consistent resultant beverage concentrate 204 that is diluted with water. By dispensing the dilution water continuously during the process for combination with the concentrate 204, a generally consistent beverage can be produced which is ready to drink after the beverage making process is completed. It is believed that the combination of the concentrate with the dilution water results in a generally consistent mixing and a generally consistent brix measurement throughout the volume of produced beverage collected in the container below the funnel.

As mentioned, the volume of the cavity 88 is generally sized and dimensioned to receive all of the beverage making substance and at least a portion of the beverage mixing water from the spray head. It is recognized that the mixing water will generally be controllably dispensed in a stream, pulses of water, or any combination of stream, pulses, and/or pauses over a predetermined period of time. Since some of the beverage material will readily dissolve with this water, some of the beverage making material dissolved in solution will flow out through the insert drain 100. As such, a calculation can be made to determine the inflow of water and the outflow of beverage concentrate for use in calculating the volume that should be used with a particular beverage making substance.

It is possible that multiple insert sizes could be configured for each funnel size. This would allow for different types of beverage making substance and different flow rates to collect within the cavity 88. In other words, if a beverage making substance tends to slowly melt or dissolve into the solution, it might require a larger volume of water before it becomes fully dissolved and starts to flow out through the opening 100. While this larger capacity insert could be used for lower capacity situations, it might be desirable to produce a smaller volume insert for use with materials that might more readily dissolve into the solution.

Also disclosed is the process as described for producing a beverage using an insert, dissolvable beverage making substance, and heated water to create a beverage concentrate or liquid beverage ingredient for subsequent controlled mixing or dilution with a predetermined volume of water or other beverage ingredient. Alternatively, the liquid beverage ingredient 204 could be dispensed over quantity of ice or into a container with reduced temperature water already provided in the container.

While it might be preferred in some situations to utilize the dilution functions of a beverage making apparatus, the insert can be used in a more simplified version that does not provide for dilution. As a result, the concentrate would be dispensed over the ice to melt the ice, thereby reducing the temperature of the concentrate while it is mixed with the ice, and melting the ice to form additional liquid, so that the final ready to drink beverage is at a desired temperature and a desired diluted concentration to achieve the ready to drink beverage end product.

Figure 13:
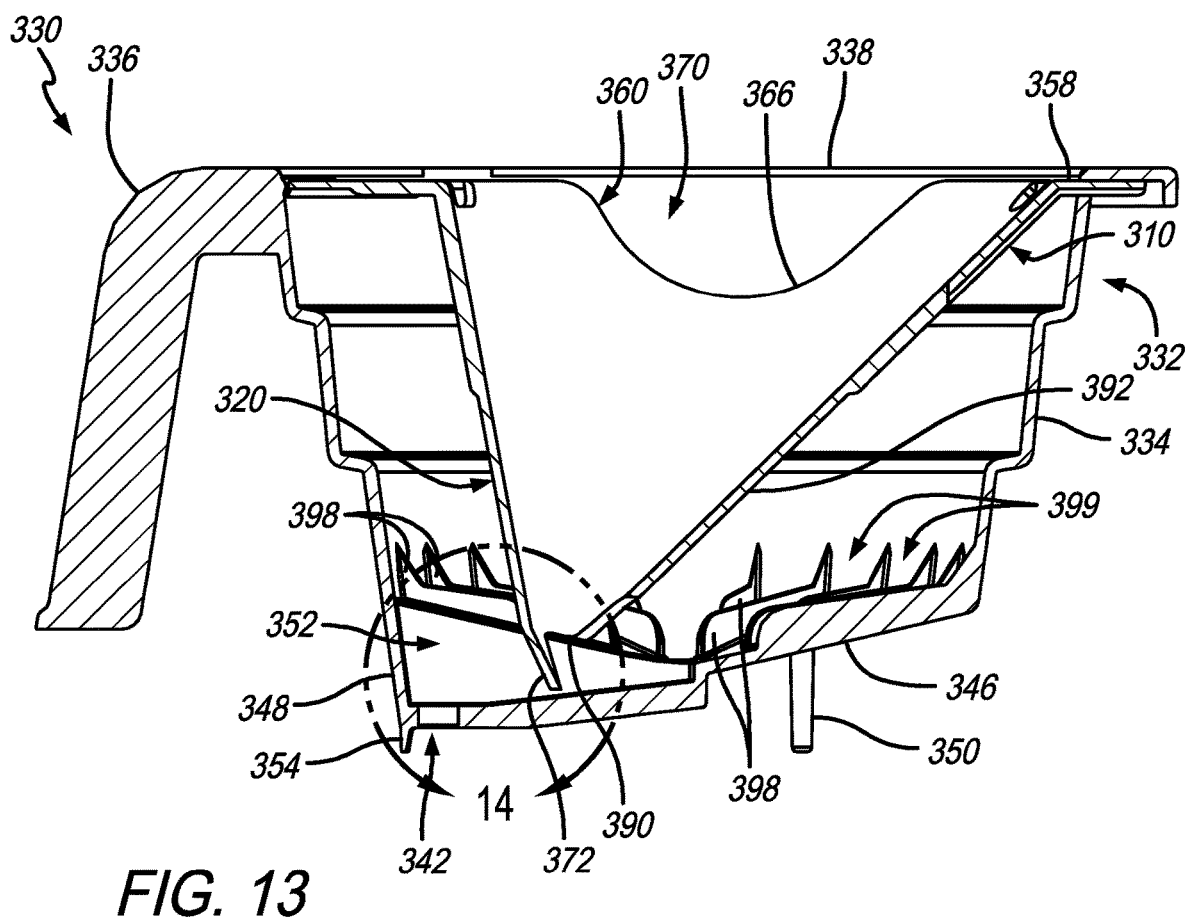
FIG. 13 is a cross-sectional view of the insert of FIG. 9 within the funnel body of the funnel, illustrating the insert includes an off-set drain hole that is configured to align with or be positioned over a channel of an offset outlet structure of the funnel body, the channel configured to direct liquid out of the funnel.

With reference again to the figures, FIGS. 9-14 illustrate another alternative embodiment of an insert 360 to be received in a funnel assembly 330 that can be used to produce a brewed beverage. Similar to the description above, the funnel assembly 330 includes a body portion 332 primarily composed of a wall 334, a handle 336 attached to and extending from the wall 334, and a rim or flange 338 positioned at a top portion of the wall 334. As shown, the funnel body 332 has a bottom portion 346 connected to the wall 334 that forms a basin to retain beverage making material. An offset outlet structure 348 is attached to and extending from the bottom portion 346. The offset outlet structure 348 forms a slot 352 accessible from an interior cavity 370 of the funnel 330, as illustrated in FIG. 13. The slot 352 directs fluid toward a funnel opening 342 that dispenses fluid from the funnel assembly 330. One or more support legs 350 are attached to the bottom portion 346 to support the funnel in an upright condition when placed on a generally horizontal surface. Similarly, a support post 354 may extend below the offset outlet structure 348 to work in conjunction with the one or more support legs 350 to support the funnel assembly 330 on a horizontal surface. Other forms of the funnel assembly 330 are envisioned herein.

Figure 11:
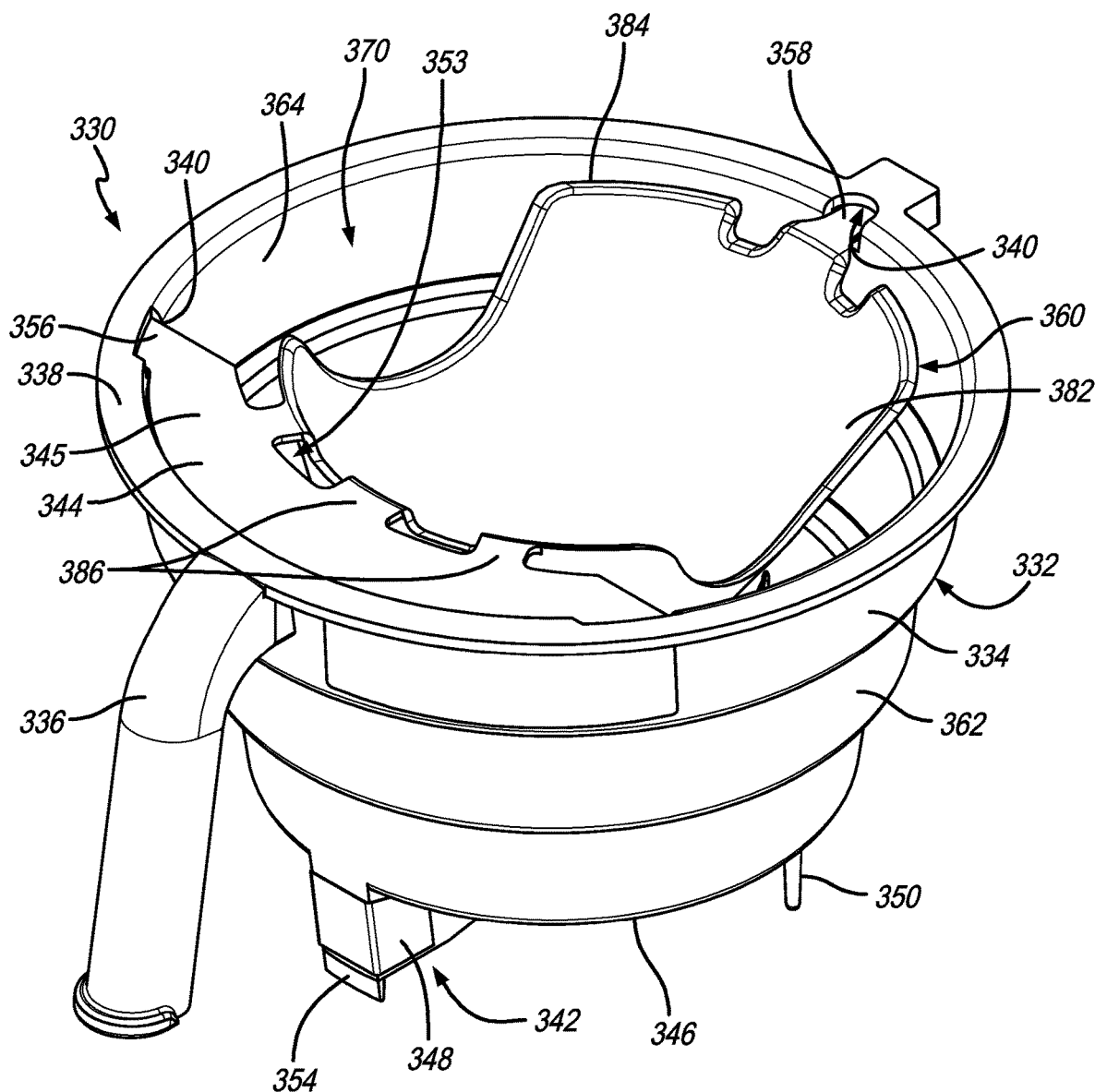
FIG. 11 is a side perspective view of the insert of FIG. 9 within a funnel body of the funnel, illustrating the insert may be configured to extent from substantially a top of the funnel body to substantially the bottom of the funnel body.
Figure 12:
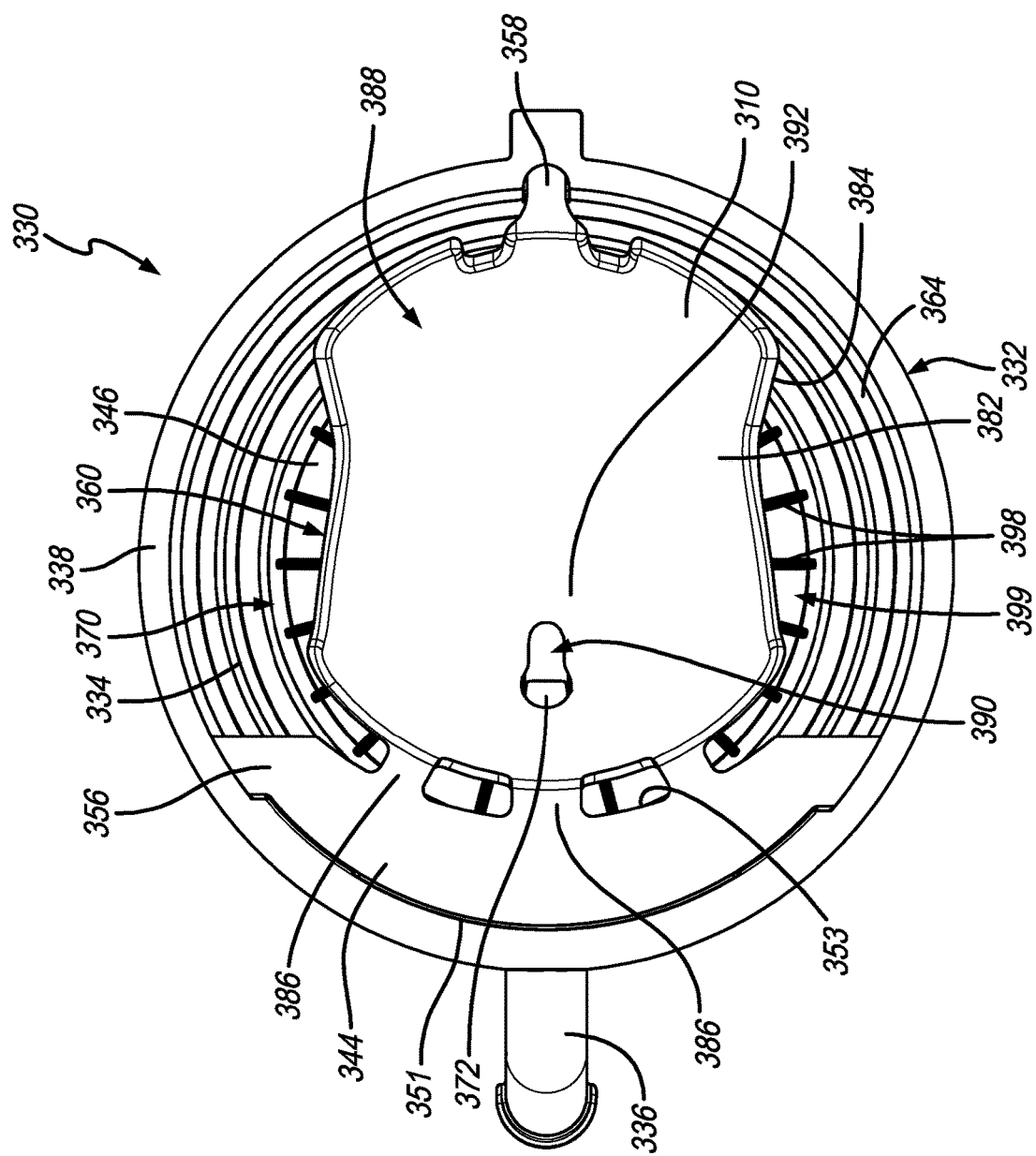
FIG. 12 is a top perspective view of the insert of FIG. 9 within the funnel body of the funnel, illustrating the insert includes a drain hole at the bottom of the insert that is off-set from the central axis of the insert or funnel body.

With regard to FIG. 11, an internal perspective view of the funnel 330 is shown illustrating the internal structures and configuration of the funnel and the insert 360 positioned in the funnel assembly 330. As noted, the funnel body 332 includes a rim or flange 338 positioned at the top edge of the wall 334. The handle 336 is generally shown attached to and extending from the wall 334 at a position adjacent the rim 338. The specific configuration of the handle is provided for purposes of illustrating the present concepts. The handle is not required to be in this position but could be positioned elsewhere or otherwise attached to or integrated with the wall 334 or other structures of the funnel 330. Alternatively, there may be no handle on the funnel assembly 330. The wall 334 includes an outside surface 362 and an inside surface 364. The insert 360 is configured to at least partially engage or abut against a portion of the funnel body 332, such as the rim 338 or the inside surface 364 of the wall 334, as described further herein. The insert 360 is positioned to substantially extend within the interior cavity 370 of the funnel 330 defined by the inside surface 364 of the wall 334 at or below the rim or flange 338.

As illustrated in FIGS. 9-13, the insert 360 is illustratively configured to be coupled to the funnel body 332 adjacent or near the rim 338 of the funnel body 332. For example, the funnel body 332 may be formed to include one or more apertures 340 that receive and retain a portion of the insert 360 to maintain the insert 360 within the funnel assembly 330. Alternatively, the insert 360 may simply abut against a portion of the rim 338 of the funnel assembly 330, or portions of the insert 360 may be received in grooves (not shown) in the rim 338 of the funnel assembly 330. Other forms of retaining the insert 360 in the funnel assembly 330 are envisioned and encompassed in the present disclosure.

Figure 9:
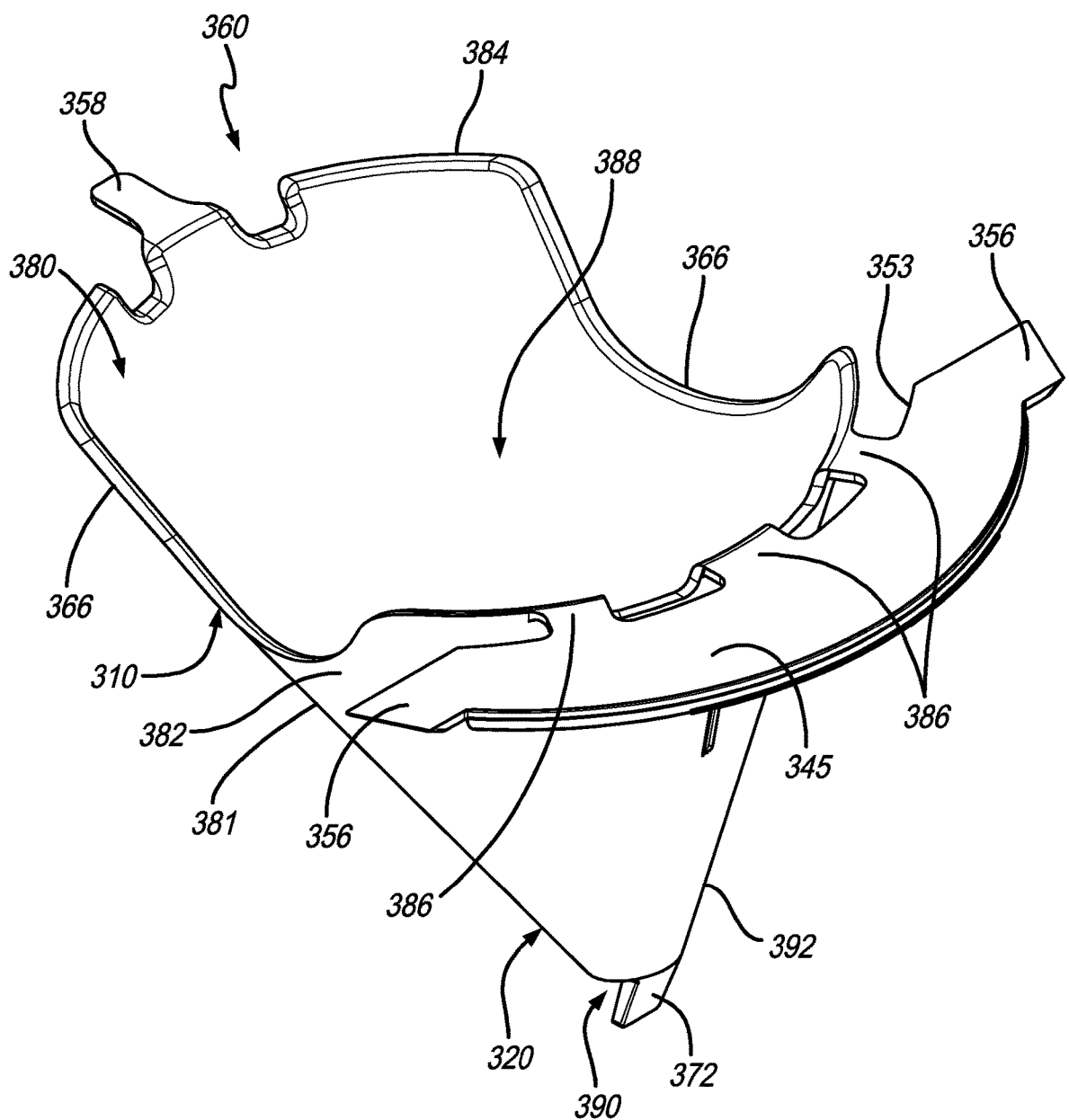
FIG. 9 is a side perspective view of another alternative exemplary embodiment of a powered beverage insert for a beverage funnel.

FIG. 9 shows an enlarged perspective view of the insert 360. Generally, the insert 360 is sized, dimensioned, and configured for positioning in the funnel body 332. The insert 360 includes an insert body 310 including a wall 382 with an upper portion 381 defining an insert rim 384. The rim 384 defines the boundary of an insert mouth 380. The insert body 310 further includes a lower basin 320 that is capable of retaining material, the basin 320 having a lower boundary defined by a base 392 of the insert body 310. The wall 382 and lower basin 320 form a cavity or void 388 of the insert 360, defined within the boundaries of the wall 382, base 392 and rim 384. In illustrative embodiments, the rim 384 may be formed to include one or more grooves or indentations 366 that extend away from the rim 384 toward the base 392 of the insert, as illustrated in FIG. 9, reducing the height of the insert 360 at those locations. In various embodiments, the insert 360 may be generally conical in shape and taper from the insert rim 384 to the base 392 of the insert 360, although other forms and shapes are envisioned herein. Generally, the shape of the insert 360 is configured to be at least partially compatible with the corresponding funnel body 332 into which it is received, although such compatibility is not required or necessary as long as the insert 360 can be received within the funnel body 332.

The insert 360 generally includes a drain aperture 390 positioned in a location near the base 392 of the insert body 310 and accessible from inside the cavity 388 of the insert 360. In various embodiments, the drain aperture 390 is located at an apex of the base 320 of the insert body 310. In other illustrative embodiments, the drain aperture 390 is in a position that is or can be configured to be the lowest portion of the insert 360. As shown in FIGS. 9-13, the drain aperture 390 may be positioned generally offset or off-center in the bottom 392 of the insert 360 from a central axis A of the insert 360, and the insert body 310 may be tapered to the drain aperture 390. In other configurations, the aperture 390 could be centered substantially along the central axis A, or in other locations as needed. Generally, the location of the drain opening is configured to provide an outlet through which the combined beverage making substance and water can flow after the beverage making substance is dissolved or at least partially integrated with the water in the insert 360.

Figure 10:
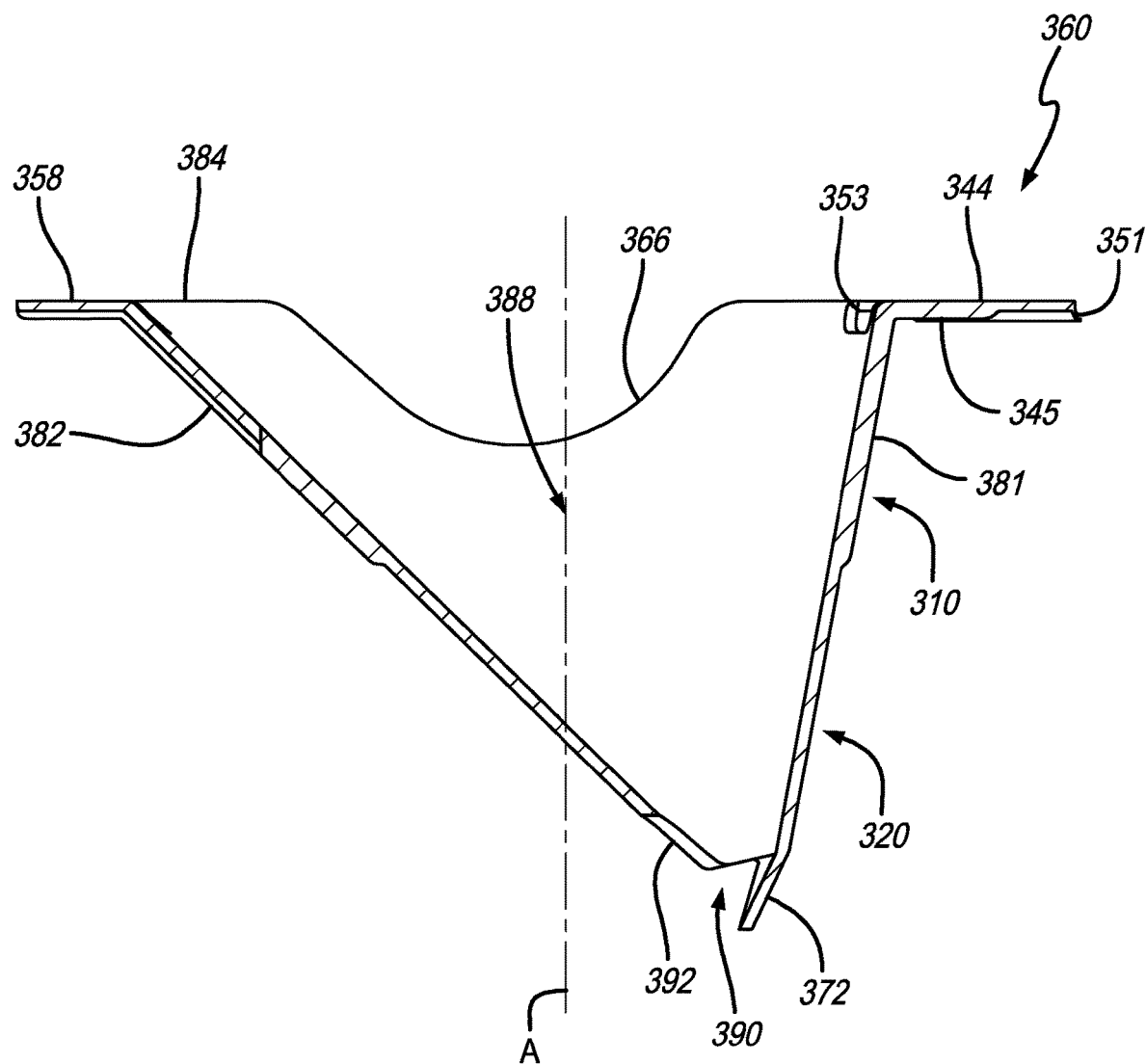
FIG. 10 is a cross-sectional view of the insert of FIG. 9.

In various embodiments, the insert 360 further includes a flow guide 372 that extends away from the lower basin 320 and towards the bottom portion 346 of the funnel body 332 when the insert 360 is received within the funnel body 332. As illustrated in FIGS. 10 and 12-14, the flow guide 372 is generally located adjacent to the drain aperture 390 and is configured to guide or direct the flow of beverage substance from the drain aperture 390 into the offset outlet structure 348 when the drain aperture is positioned over the slot 352 of the offset outlet structure 348. In various embodiments, the flow guide 372 may be positioned to be angled with respect to the walls of the base 320 to direct the flow of fluid slightly away from the funnel opening 342, as illustrated in FIGS. 10 and 13. By directing the flow of fluid away from the funnel opening 342, the flow guides 372 facilitate additional mixing or interaction of the beverage substance (as it will then naturally be directed back to the funnel opening 342 due to the directional flow of the offset outlet structure 348) to enhance or elongate the mixing of the powdered material with liquid before it leaves the funnel opening 342, as is understood from the figures. Various angles of the flow guide 372 are envisioned herein. After being directed by the flow guide 372, the beverage substance can travel between a tip of the flow guide 372 and an interior surface of the offset outlet structure 348 through the slot 352 to the funnel opening 342.

The drainage opening 390 is positioned to drain liquid into the slot 352 of the offset outlet structure 348 of the funnel assembly 330, as illustrated in FIG. 13. In various embodiments, visible or raised arrows (not shown) may be used on the insert 360 and the funnel assembly 330 in order to ensure that a user "clocks" the insert 360 properly to position the drainage opening 390 above the slot 352. Alternatively, the flow guide 372 of the insert 360 may be configured to mate with the sides of the offset outlet structure 348, or another portion of the funnel assembly 330, in order to ensure that the drainage opening 390 is positioned above the slot 352 to drain liquid into the slot 352 and out of the funnel assembly 330.

In illustrative embodiments, a mesh material (not shown) may be positioned over the drain aperture 390. The mesh can be attached to or molded in the material forming the basin 320 to retain it in position over the drain aperture 390. While the mesh or other material (not shown) could be configured to be removable, a preferred embodiment is to integrally mold the mesh in the basin 320 material so that it can be, generally, permanently retained in the basin 320. The material is described as mesh but can be any variety of configuration(s) of material that permits a dissolved beverage making substance in the water to flow through the drain aperture 390. In this regard, during the beverage making process the beverage making material has become at least partially dissolved and generally fluid allowing it to flow in solution with the water through the mesh material and drain aperture 390.

The drain aperture 390 and/or mesh material (not shown) are configured to allow fluids to pass therethrough but are sized and dimensioned to provide some restriction of particles and fluids there through. In addition, the openings formed in the mesh or grate material may be sized and dimensioned to prohibit larger particles of the beverage making substance from flowing through the mesh (e.g. undissolved clumps of material). This helps promote the substantial integration of the beverage making substance ingredients into the water. The beverage making substance might be formed of ingredients including a sugar material or other natural, synthetic, or a combination of sweeteners and may include coloring ingredients, flavoring ingredients, sweetening ingredients and other ingredients providing other flavors or beverage characteristics. An ingredient may be included to provide a particular mouth feel of the resultant beverage once the ingredients have been mixed in the water.

As will be described, the function of the insert 360 is to retain a quantity of powdered, particulate, granulated, or other beverage material for dilution, dissolving, melting or otherwise combination with water, for example, heated water. As illustrated for example in FIG. 12, the insert basin 320 includes a drain aperture 390, illustratively formed in the base 392, that permits liquid to drain through the insert 360 and into the slot 352 formed in the offset outlet structure 348 of the funnel assembly 330 to be dispersed therefrom. In other embodiments, the drain aperture 390 may drain liquid onto or between one or more ribs 398 in the base of the funnel body 332, wherein the liquid may then be funneled into the offset outlet structure 348. In illustrative embodiments, the shape of the insert 360 is designed to facilitate and promote directing of liquid toward an area of powdered material contained in the insert 360, and mixing of the liquid with the powdered material to form a beverage substance. As noted previously, the insert 360 may be configured to further prevent powdered material from being unintentionally retained in undesirable locations in the funnel assembly 330, such as between ribs 398 on the bottom of the funnel body 332, after the beverage production process.

The insert 360 may further optionally include a liquid shield 344 that is attached to the insert body 310 and is connectable to the funnel assembly 330 adjacent the handle 336, as illustrated in FIG. 11. The liquid shield 344 may be similar to the devices as shown in U.S. Pat. Nos. 6,055,900, 6,487,961, and 6,497,818, which are assigned to Bunn-O-Matic Corporation, the assignee of the present application and which patents are incorporated by reference herein in their entirety. As is understood, the liquid shield 344 may be configured to prevent or reduce splashing of liquid out of the funnel assembly 330 onto a user's hand on the handle 336. Accordingly, the liquid shield 344 prevents a material (not shown) from escaping the cavity 370 of the funnel assembly 330, particularly if such material is sloshed around prior to exiting the funnel assembly 330 through the offset outlet structure 348 of the funnel assembly 330. In various embodiments, the liquid shield 344 may form a seal that prevents liquid or beverage substance from spilling out between the liquid shield 344 and the inside surface 364 of the funnel body 332. In illustrative embodiments, the insert body 310 and liquid shield 344 may be integrally formed together, and may further be formed of material that is resistant to moisture and heat, such as the material from which the brewing funnel assembly 330 is formed, or any other suitable material. While the shield 344 is shown herein in combination with the insert body 310 to be connected to the funnel body 332, additional embodiments of the shield 344 or insert body 310 which utilize other connection features may be configured based on the teachings provided herein.

The liquid shield 344 of the insert 360 includes a body portion 345 which extends inwardly over at least a portion of the interior cavity 370 defined by the side wall 334 of the funnel body 332 of the funnel assembly 330. As illustrated in FIG. 11, the liquid shield 344 is generally located inside the circumference of the funnel 330 when connected to the funnel assembly 330. The body portion 345 of the liquid shield 344 includes a first edge 351, generally proximate to the brewing funnel 330 and in particular the inside surface 364 of the side wall 334. A second edge 353 is positioned generally opposite the first edge 351 extending over the cavity 370 when the liquid shield 344 is coupled to the funnel assembly 330. One or more connection tabs 356 may extend from the first edge 351. The one or more tabs 356 are generally configured to be received within one or more apertures 340 of the funnel body 332 to retain the insert 360 in the cavity 370 of the funnel assembly 330. Alternatively, the one or more tabs 356 may simply abut against or lie on top of a portion of the funnel assembly 330, such as the rim 338. The liquid shield 344 may be connected to the insert rim 384 of the insert body 310 via one or more connectors 386, as illustrated in FIGS. 9 and 11.

While the design and placement of the liquid shield 344 relative to the funnel assembly 330 and insert body 310 as show in the figures is generally symmetric relative to the handle 336, it is envisioned that there may be other relationships between the handle 336 and/or the insert body 310 and the liquid shield 344. For example, if the geometry of the funnel 330 is different, the relational movement of the liquid and beverage brewing substance in the funnel 330 may dictate placement of the liquid shield 344 in a different location relative to the handle 336 or insert body 310.

The insert 360 may further optionally include a retaining tab 358 that is further configured to retain the insert 360 within the cavity 370 of the funnel assembly 330. As illustrated in FIG. 11, the retaining tab 358 may be positioned generally opposite of the liquid shield 344, although other positions and locations are envisioned herein. The retaining tab 358 may also engage with one of the apertures 340 of the funnel body to retail the insert 360 in a substantially fixed position, or may simply abut against a top surface of the funnel assembly 330, such as the rim 338.

The insert 360 is formed of a material that is compatible for use with food products. The materials can be chosen for its qualities in relation to the type of beverage making substance ingredients that will come in contact with the material surfaces. Additionally, the material can be chosen for its properties relative to the use and contact with hot water. The beverage making equipment that is used to produce this beverage typically will dispense hot water into the basin. The hot water provides a preferred chemical reaction to dissolve, melt, or otherwise break down the beverage making substance materials to dissolve it and carry it in the water, or in other words suspend or integrate the beverage ingredients in solution. It is a generally well-known chemical principal that heated water has a greater capacity to maintain other ingredients in solution. As such, the preferred material could be selected for its food grade properties under these various conditions. One example of a possible material would be silicone that is suitable for use in such a food preparation environment. In addition, it could be preferred to provide an insert material that generally does not retain flavor or color characteristics from batch to batch. This will help prevent flavor or color transfer from altering the desired resultant beverage results.

Figure 14:
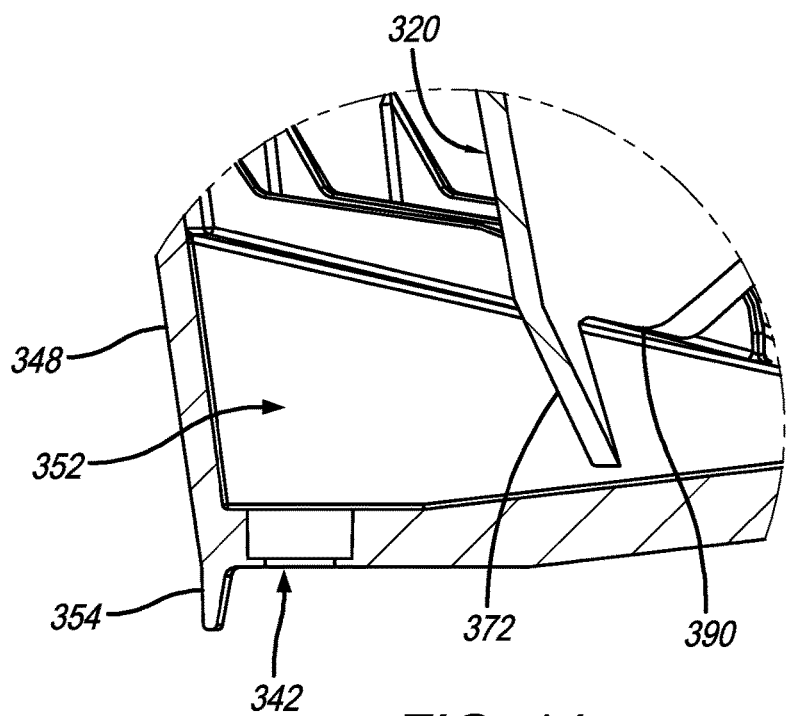
FIG. 14 is a detailed cross-sectional view taken from FIG. 13, illustrating a directional tip or flow guide on the bottom of the insert adjacent the off-set drain hole extends into the channel of the outset outlet structure to at least partially direct the flow of fluid from the insert into the outset outlet structure to then exit the funnel.

Turning to FIGS. 13-14, a cross section of the funnel 330 including the insert 360 retained therein is shown. FIG. 14 illustrates an enlarged view of a cross section of the insert 360 shown in FIG. 13. The insert 360 is configured to be substantially retained within the funnel body 332 to contain beverage making material therein. Water or other liquid can be dispensed over the funnel mouth into the cavity 370 of the funnel 330, with at least a portion of the liquid being directed into the cavity 388 insert 360 via the wall 382 of the insert body 310. Alternatively, all of the liquid may be directed into the insert 360. Alternatively still, a majority of the liquid may be directed into the insert 360 and a portion of the liquid may be directed to fall outside of the insert 360 in the cavity 370 of the funnel, for example, through the grooves 366 in the rim 384 of the insert body 310. The liquid directed into the insert 360 will be mixed with the beverage making material (e.g. powder) retained in the insert 360 and will form an integrated or partially integrated beverage mixture that can drain out of the drainage aperture 390 of the insert 360. As the integrated beverage mixture drains out of the aperture 390, it may be directed by a flow guide 372 into a specific flow path into the slot 352 of the offset outlet structure 348, and thereafter will drain out of the offset outlet structure 348 to be dispensed into a user's container. In various embodiments, if liquid is directed to fall outside of the insert 370 into the cavity 370 of the funnel, such liquid may also be directed into the slot 352 of the offset outlet structure 348 to mix with the beverage mixture draining from the insert 360 within the slot 352, permitting further dilution of the beverage before dispensing.

In various embodiments, the beverage solution drains through the insert 360 and can bypass around portions of the funnel assembly 330, such as one or more ribs 398 in the bottom of the funnel body 332. The ribs 398 are typically provided on the inside of the funnel body 332 to support a filter material lining the inside of the funnel body and used to contain a beverage brewing substance such a coffee or tea. When the funnel body 332 is used with coffee or tea, the coffee or tea seeps or flow out through the filter material retained on top of the ribs and drains into channels 399 defined between spaced-apart neighboring ribs 398. The ribs support the filter material even when saturated with beverage and water and the channels 399 allow for a beverage to flow from below the filter material and out through the funnel opening 342 extending through the offset outlet structure 348.

The insert 360 provides the advantage of retaining the powdered beverage making substance in the basin or cavity 388 of the insert 360 for mixing with water to dissolve it and form a liquid beverage or liquid beverage making ingredient. If the powdered substance was placed directly into the funnel without the insert 360, portions or particles of this substance might become attached in undesired areas, stuck to the inside surfaces of the funnel body, or lodged in areas such as the intersection between the bottom portion 346 and one or more ribs 398 of the funnel assembly 330, the intersection between the wall 334 and bottom portion 346 of the funnel assembly 330, or an inside surface of a funnel bottom 346 in one or more channel areas 399 formed between the ribs 398. This entrapment of beverage making substance particles could be undesirable since it could transfer flavor, coloration, or other characteristics to the next batch of beverage made in the funnel. Additionally, if this material is entrapped on the funnel surface (when not using the insert 360) it could attract or promote undesired organisms that could grow on the remaining nutritional components of the particles. For example, if the beverage making substance includes sugar or other organic flavorings this material could provide a food source for the growth of such organisms. Therefore, the use of the insert 360 eliminates or at least reduces particles being trapped in the funnel thereby preventing the development of undesirable organisms.

In use, a beverage making apparatus can be used to produce a beverage which may not include freshly ground coffee or tea particles but may be comprised primarily of one or more ingredients including flavorings, sweeteners, colorants, aroma ingredients, ingredients to produce a desired texture as well as other ingredients to produce a resultant beverage. The insert 360 has been produced to fit in a relatively conforming configuration within the funnel body used with this beverage making equipment. When making a batch of beverage using a powdered or granular material, the insert 360 is placed in the cavity of the brewing funnel. Once positioned and retained, the beverage making substance can be placed in the cavity 388 of the insert 360. The funnel is positioned in the brewer for receiving water from a spray head (not shown). Once the water contacts the beverage making substance in the insert 360, it tends to become dissolved in this water and ingredient mixture. The liquid portion of the dissolved combined beverage ingredient and water flows out of the insert 360 through a drain opening 390, and optionally a mesh or grate material (not shown), and flows out through the funnel offset outlet structure 348.

In one preferred configuration, the volume of the cavity 388 is sized and dimensioned to receive the volume of beverage making substance for producing a batch of beverage. The volume should be compatible also to receive at least a portion of the water to be used in the mixing and dissolving of the beverage making substance generally to retain the entire volume of the mixture within the cavity 388 of the insert 360 during the beverage making process. During one embodiment of the beverage making process, a separate quantity of water can be controllably dispensed by the beverage making apparatus into the receiving container. In other words, the receiving container positioned under the funnel outlet 342 receives the liquid beverage ingredients from the funnel assembly as well as a separate volume of dilution water for mixing with the beverage ingredients. The dilution water can be at ambient or reduced temperature to help promote the cooling of the beverage produced with the insert. As such, the use of multiple doses of water for different purposes during this beverage making process can be optimized to produce a consistent resultant beverage concentrate that is diluted with water. By dispensing the dilution water continuously during the process for combination with the concentrate a generally consistent beverage can be produced which is ready to drink after the beverage making process is completed. It is believed that the combination of the concentrate with the dilution water results in a generally consistent mixing and a generally consistent brix measurement throughout the volume of produced beverage collected in the container below the funnel.

In an alternative embodiment, water may be dispensed from a spray head over the funnel assembly 330 wherein some of the water by-passes the insert 360 and any beverage material retained therein. For instance, the spray head may dispense some water into the insert 360 and some water outside of the insert 360 but still within the cavity 370 of the funnel assembly 330. As described herein, such dispensing may occur via use of the grooves 366 in the rim 382 of the insert body 310. Water directed directly into the cavity 370 that bypasses the insert 360 may exit the funnel assembly 330 under normal operation via the offset outlet structure 348. Such water may mix with any beverage substance formed in the insert 360 before or during dispensing out of the funnel assembly 330.

As mentioned, the volume of the cavity 388 is generally sized and dimensioned to receive all of the beverage making substance and at least a portion of the beverage mixing water from the spray head (not shown). It is recognized that the mixing water will generally be controllably dispensed in a stream, pulses of water, or any combination of stream, pulses, and/or pauses over a predetermined period of time. Since some of the beverage material will readily dissolve with this water, some of the beverage making material dissolved in solution will flow out through the insert drain opening 390. As such, a calculation can be made to determine the inflow of water and the outflow of beverage concentrate for use in calculating the volume that should be used with a particular beverage making substance.

It is possible that multiple insert sizes could be configured for each funnel size. This would allow for different types of beverage making substance and different flow rates to collect within the cavity 388. In other words, if a beverage making substance tends to slowly melt or dissolve into the solution it might require a larger volume of water before it becomes fully dissolved and starts to flow out through the opening 390. While this larger capacity insert could be used for lower capacity situations, it might be desirable to produce a smaller volume insert for use with materials that might more readily dissolve into the solution.

Also disclosed is the process as described for producing a beverage using an insert, dissolvable beverage making substance, and heated water to create a beverage concentrate or liquid beverage ingredient for subsequent controlled mixing or dilution with a predetermined volume of water or other beverage ingredient. Alternatively, the liquid beverage ingredient could be dispensed over quantity of ice or into a container with reduced temperature water already provided in the container.

Figure 15:
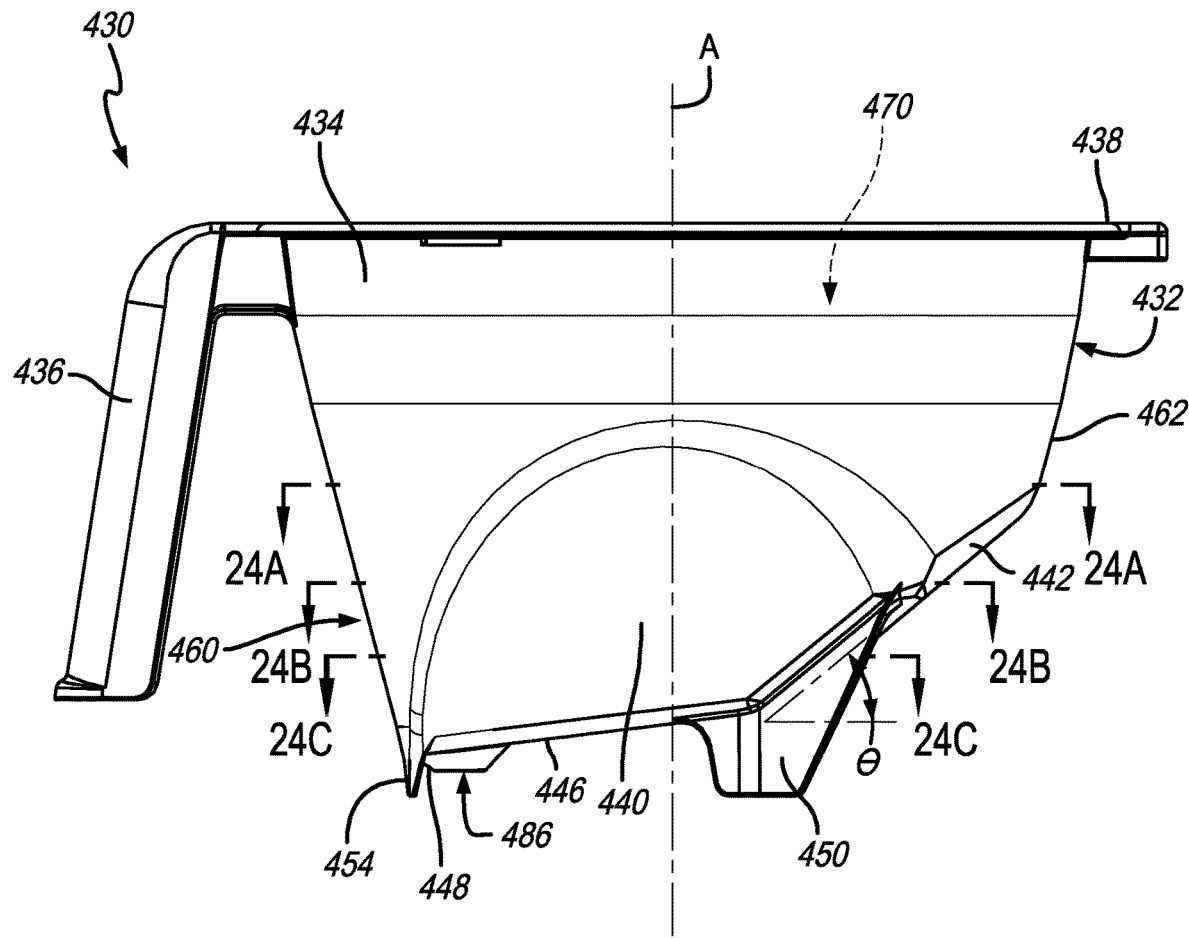
FIG. 15 is a side elevational view of an alternative embodiment of a funnel assembly of the present disclosure for use with a beverage brewing apparatus, such as a beverage brewing apparatus for producing iced tea, including an offset outlet portion and a generally partially conical wall defining a cavity therein.
Figure 21:
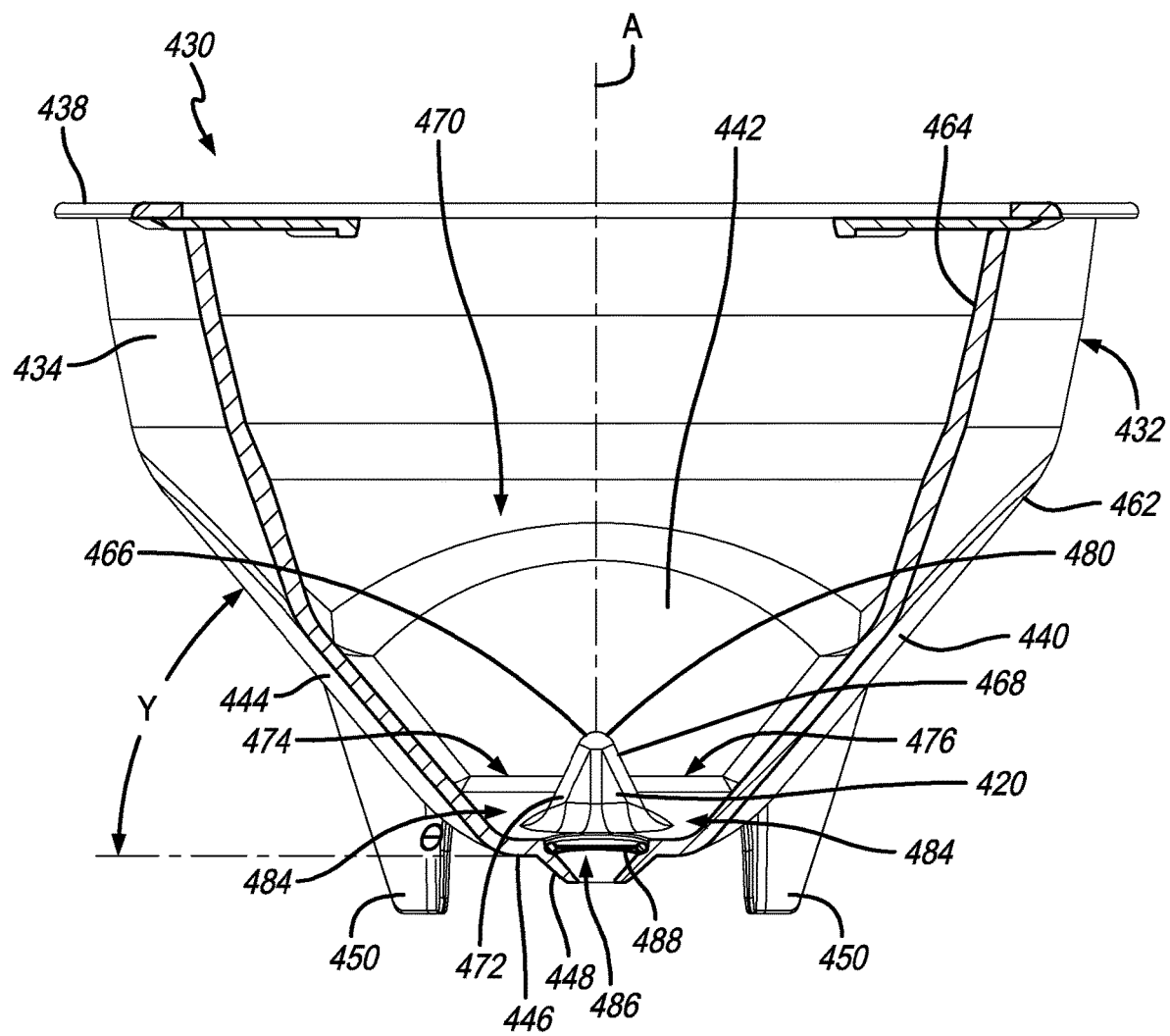
FIG. 21 is a cross sectional view of the funnel assembly taken along the line 21-21 in FIG. 16 and showing the cross section through a portion of the funnel assembly that generally corresponds with the offset outlet drain.
Figure 22:
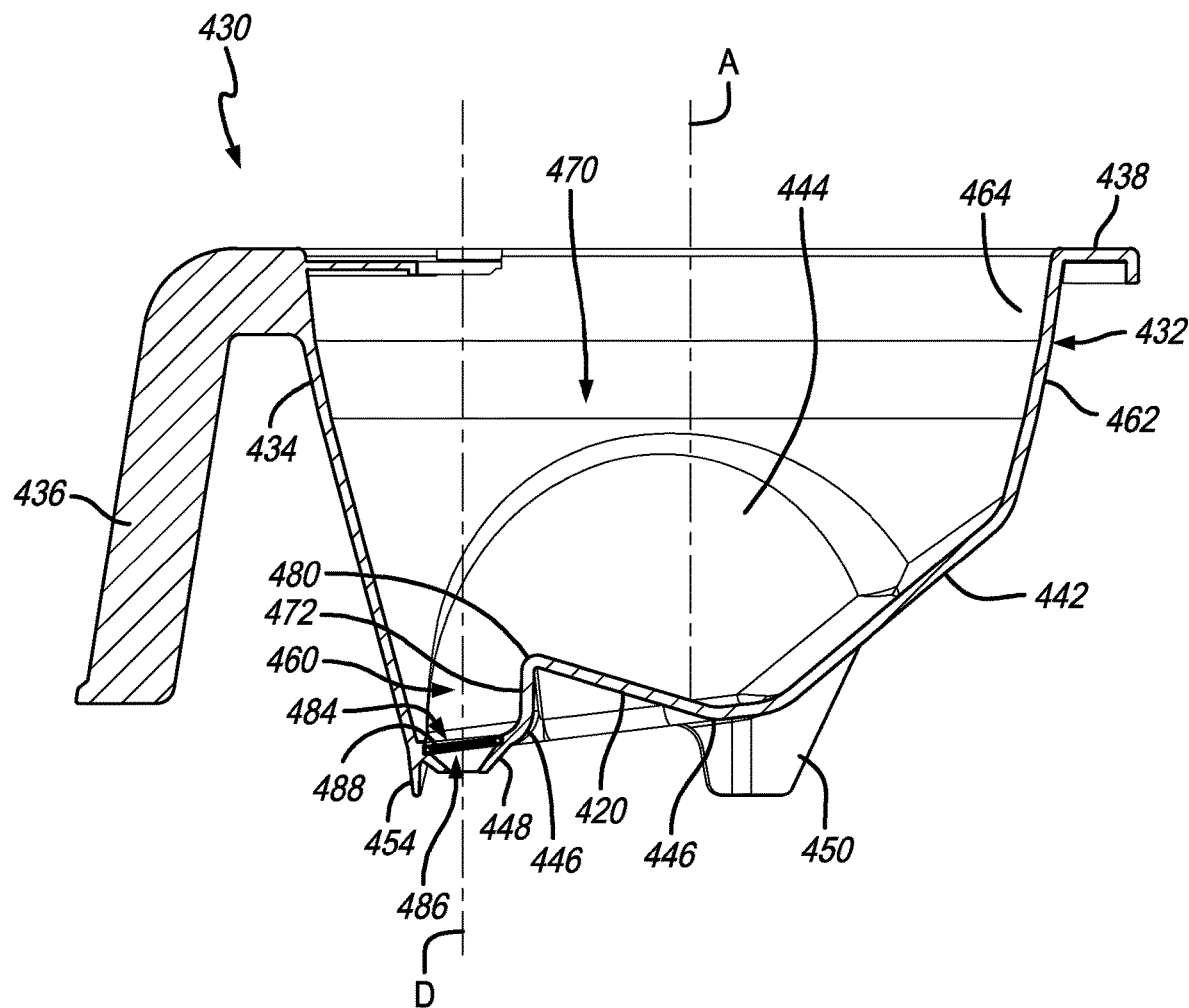
FIG. 22 is a cross sectional view of the funnel assembly taken along the line 22-22 in FIG. 16 and showing the cross section through a portion of the funnel assembly that is generally along a central line of the funnel assembly and is generally perpendicular to the cross-sectional view of FIG. 21.

With reference to the figures, FIGS. 15-24C shows a side elevational view of an alternative embodiment of a funnel assembly 30 that can be used to produce a brewed beverage in a standard brewing apparatus or equipment. The funnel assembly includes a body portion 432 primarily composed of an annular wall 434, a handle 436 attached to and extending from the wall 4434, and a rim or flange 438 positioned at a top portion of the wall 434. The body portion 432 generally forms an interior cavity 470 of the funnel 430 that is capable of containing and holding liquids or powdered substances. As shown, the funnel body 432 has a wall 434 that is generally circular in nature but that includes one or more angled or tapered portions or facets (440, 442, 444). The funnel body 432 further includes a bottom wall 446 connected to the wall 434, and the bottom wall 446 may also be angled or tapered as illustrated. Other forms of the funnel body 432 are envisioned herein. An offset outlet structure 448 is positioned attached to and extending from the bottom wall 446. The offset outlet structure 448 forms a recessed cup or indent that is accessible from the interior cavity 470 of the funnel 430, as illustrated in FIGS. 21 and 22. One or more support legs 450 are attached to the bottom to support the funnel 430 in an upright condition when placed on a generally horizontal surface. Similarly, a support post 454 may extend adjacent the offset outlet structure 448 to work in conjunction with the one or more support legs 450 to support the funnel assembly 430 on a horizontal surface. As illustrated in FIG. 15, the funnel assembly 430 has a central axis A that may generally be defined by the annular wall 434 and/or the rim 438.

Figure 18:
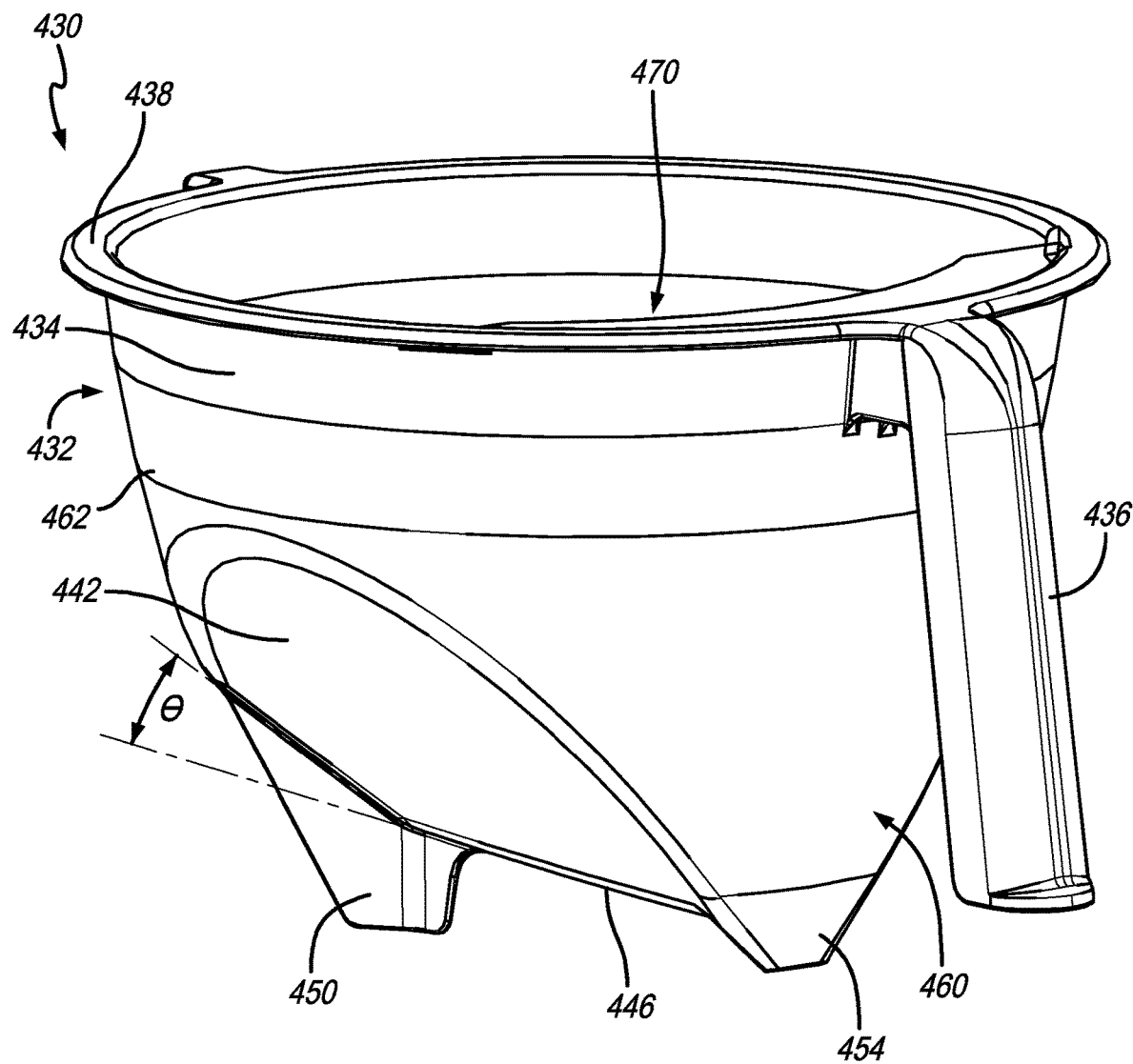
FIG. 18 is side perspective view of the funnel assembly of FIG. 15 illustrating portions of the sides of the funnel body taper downward to a reduced diameter-bottom of the funnel body.
Figure 19:
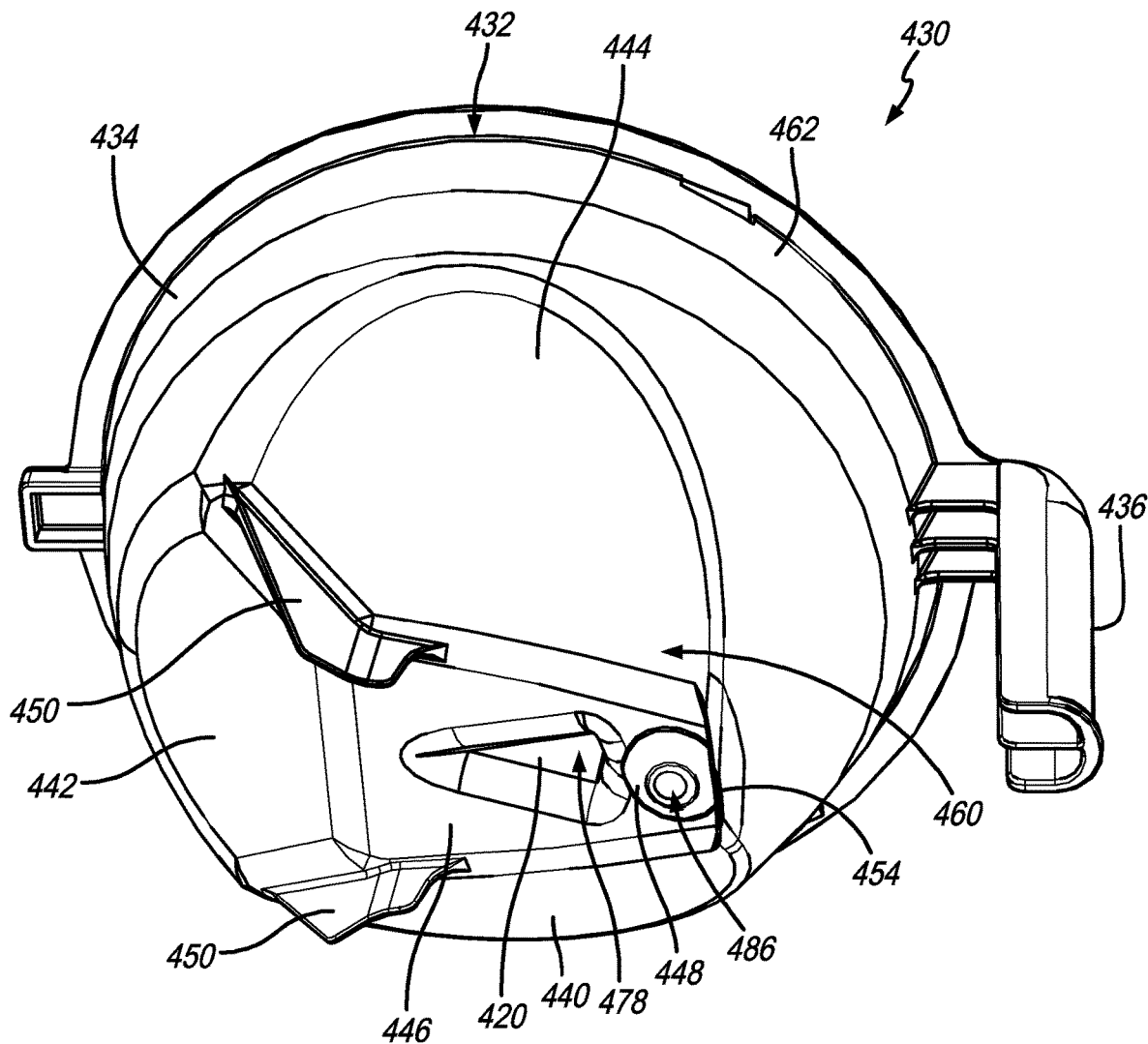
FIG. 19 is a bottom perspective view of the funnel assembly of FIG. 15 illustrating the bottom of the funnel assembly includes stabilization legs and further illustrating the offset drain extends down and away from the bottom of the funnel assembly and the upwardly-extending projection extends up and into the cavity of the funnel assembly forming an indentation in the bottom surface of the bottom.
Figure 20:
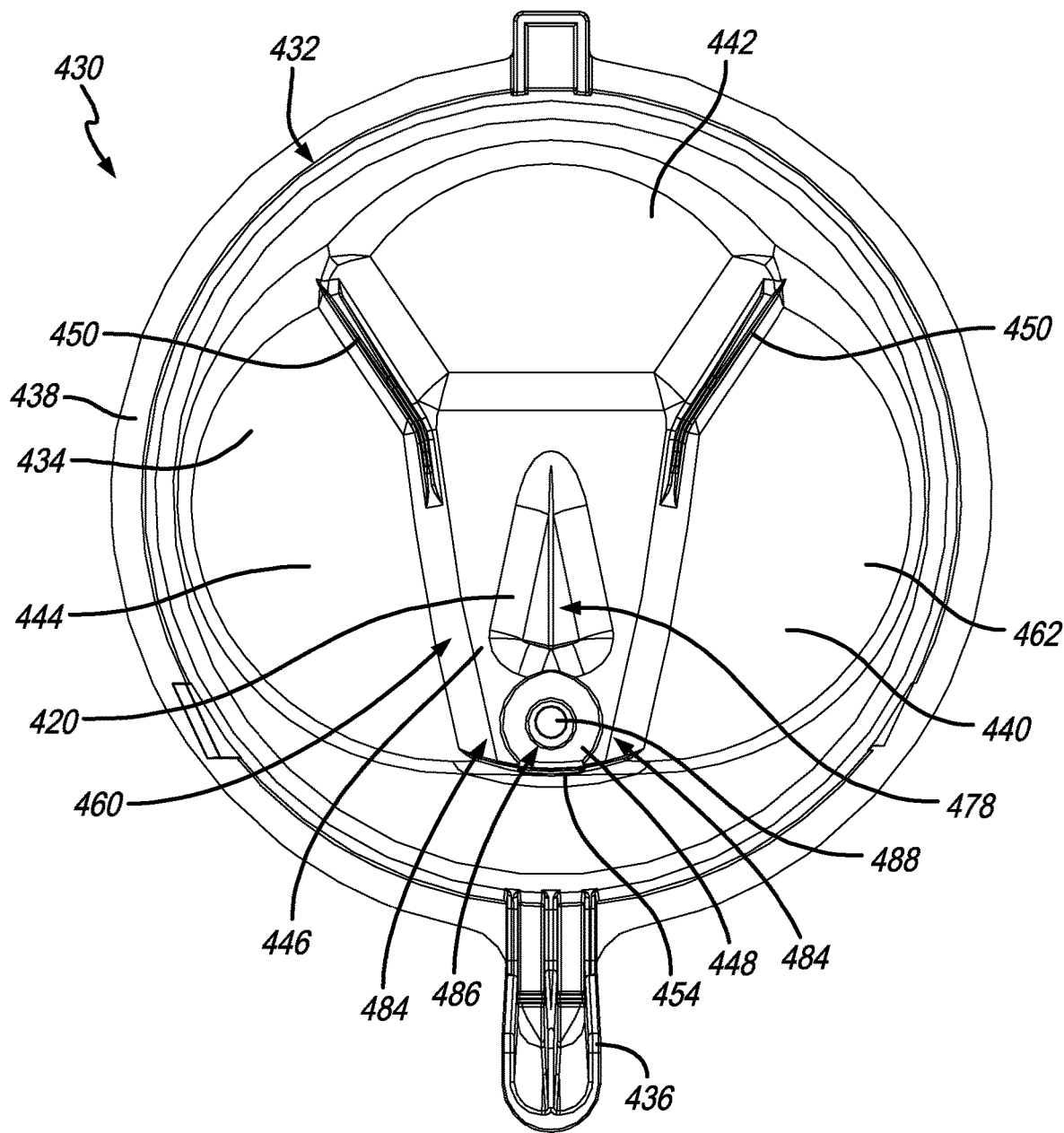
FIG. 20 is a bottom view of the funnel assembly of FIG. 15, illustrating alignment of the outlet drain aperture as being annularly outward of the upwardly-extending protrusion.

In illustrative embodiments, the angled walls 440, 442, and 444 may be angled with respect to the bottom of the funnel assembly at various angles, for example, angles X and Y as illustrated in FIGS. 15, 18 and 21. The angle of the walls 440, 442 and 444 may be dependent on the angle of the wall necessary to receive and transmit a stream of liquid to a powdered material within the bottom of the funnel assembly 430 in order to achieve adequate mixing, as described in further detail below. Although various angles are envisioned herein, the angles X and Y may include an angle that is at least 45 degrees with respect to the bottom of the funnel 430. Further, the specific angles X and Y for the walls 440, 442 and 444 may be different or the same.

It should be noted that while a particular style of brewing funnel is shown in the figures, a variety of configurations could be used to achieve the same or substantially similar results as described in this detailed description. A variety of funnel body structures and other configurations can be used to achieve substantially the same results in substantially the same way based on the teachings of the description. Applicant intends that the drawings will provide illustration of the general principles but will not limit the application of those principles to specific configurations, materials, dimensions or other limitations. Rather, the intent of this application is to broadly disclose and claim the structural and functional concepts set forth herein. As an example, while various angled portions (440, 442, 444) are shown, the wall 434 could be generally a continuous circle without the angled portions, and the funnel body might be configured without a specifically defined shape to the base or floor, with the wall transitioning into a lower area with no specific shape.

Figure 16:
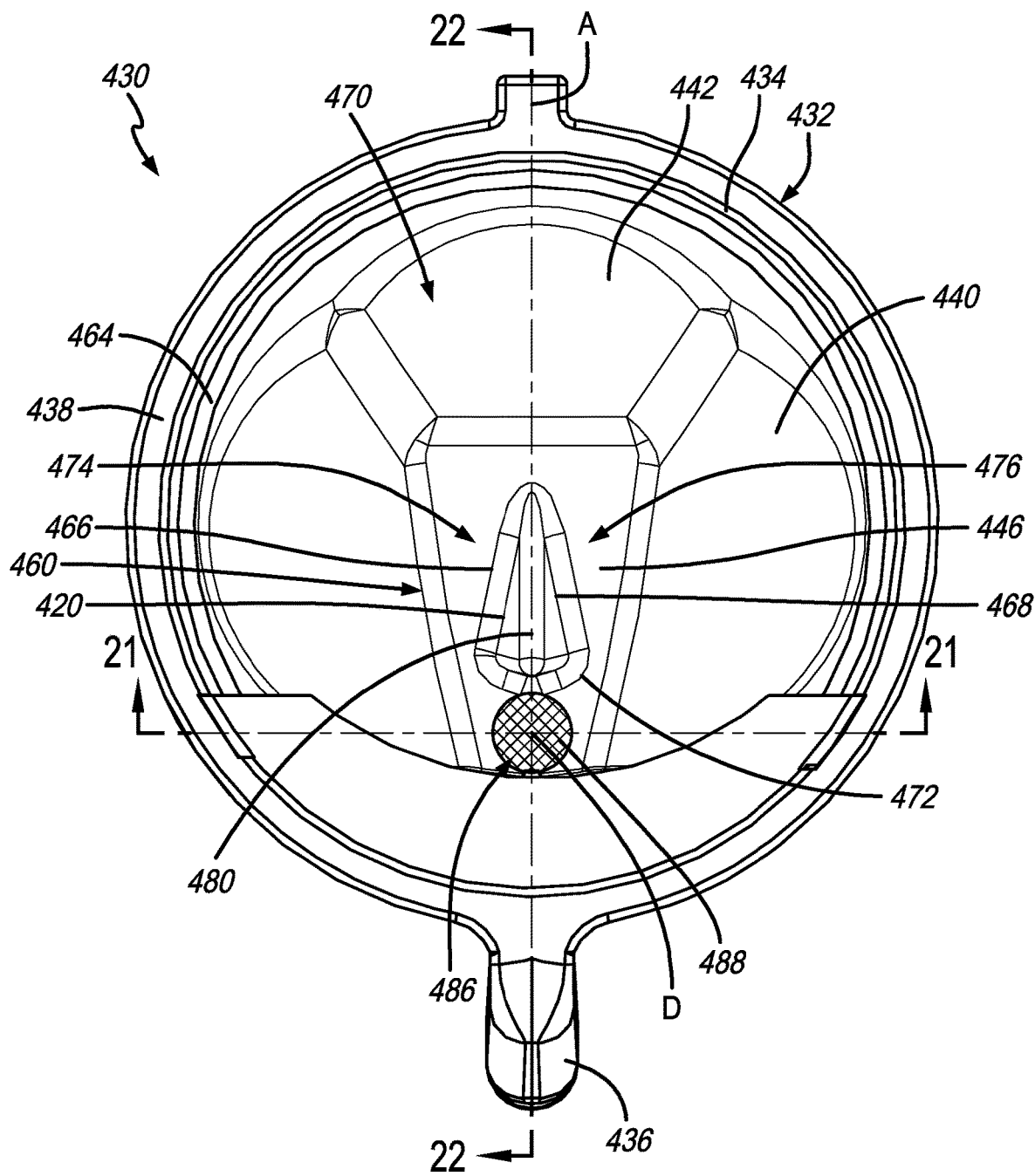
FIG. 16 is a top view of the funnel assembly shown in FIG. 15 showing interior portions of a funnel body revealing a cavity defined by a surrounding wall and a bottom, the bottom including an offset outlet drain and further including an upwardly-extending projection annularly inward of the outlet drain.

With regard to FIG. 16, an internal perspective view of the funnel 430 is shown, illustrating the internal structures and configuration of the funnel body 432. As noted, the funnel body 432 includes a rim or flange 438 positioned at the top edge of the wall 434. The handle 436 is generally shown attached to and extending from the wall 434 at a position adjacent the flange 438. The specific configuration of the handle 436 is provided for purposes of illustrating the present concepts. The handle 436 is not required to be in this position but could be positioned elsewhere or otherwise attached to or integrated with the wall 434 or other structures of the funnel 430. Alternatively, there may be no handle on the funnel assembly 430. The wall 434 includes an outside surface 462 and an inside surface 464, with the inside surface 464 generally defining the cavity 470 of the funnel body 432.

As will be described, the function of the funnel 430 is to retain a quantity of powdered, particulate, granulated, or other beverage material for dilution, dissolving, melting or otherwise combination with water. The funnel 430 includes a base portion 460 that is configured to collect a powdered material 500 and permit liquid to mix with the powdered material 500 to form a beverage substance that can drain through the outlet structure 448 of the funnel assembly 430 to be dispersed therefrom.

The term beverage as may be used herein is intended to be defined as including for purposes of illustration but not limitation the making of fruit juice based drinks, sweetener and flavor based drinks, and lemonade or other "-ade" drinks. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified.

Beverage powder or ingredients will be described in the present application and will be generally referred to as fruit based drinks or lemonade. However, it will be understood that the term beverage ingredient should be broadly interpreted regardless of reference to beverage ingredient. In addition, the characteristics or form of the beverage ingredient can be any variety of ingredients, which are currently known or hereafter developed. The form of the beverage ingredient may include powder, liquid, gel, crystal, flake, freeze-dried and any other form or state regardless of temperature, phase, or other characteristics. Reference to beverage dispensing includes reconstituting, brewing, steeping, or any other form of combining a dilution ingredient with a beverage ingredient using the concepts of the present disclosure.

Moreover, while "beverage" is referred to, it is envisioned that any variety of food ingredients could be placed in an ingredient container to reconstitute a desired food. In this regard, the food could take the form of juice, coffee, tea, other flavored beverages, as well as other foods. Furthermore, use of a dilution ingredient is to be broadly interpreted. While "water" is referred to for convenience and purposes of illustration but not limitation throughout the disclosure, it should be understood that any variety of dilution ingredients could be used with the present disclosure.

As illustrated in FIG. 15, the base portion 460 of the funnel assembly 430 may be generally defined by the annular wall 434 and the bottom wall 446 of the funnel body 432. The cavity 470 extends through the base portion 460 to permit a powdered substance 500 to accumulate in the base portion 460 when it is poured or inserted into the funnel assembly 430 annularly inward of the rim 438. In typical use, the powdered substance may be poured or inserted into the funnel assembly adjacent or along the central axis A—the central axis A generally corresponding to the middle of the funnel assembly 430 and therefore providing the easiest access to the base portion 460 of the funnel assembly 430, as illustrated in FIGS. 15-17, 21 and 23.

In illustrative embodiments, the base portion 460 includes a drain aperture 486 and an upwardly extending projection or fin 420 positioned along or within the bottom wall 446 of the funnel body 432. In use, the powdered substance 500 is configured to be received within the base portion 460 and fall to the bottom wall 446 to interact with the drain aperture 486 and upwardly extending projection 420, as illustrated across FIGS. 16-17. The powdered substance 500 is retained within the base portion 460 while a stream of water or other liquid is sprayed over the powdered substance 500 to be mixed with the powdered substance 500 to form a beverage substance.

The drain aperture 486 is positioned in a location inside the outlet structure 448 or the bottom wall 446 and accessible by the cavity 470. In illustrative embodiments, the outlet structure 448 is formed to include the drain aperture 486. In various embodiments, the drain aperture 486 is in a position that is or can be configured to be the lowest portion of the bottom wall 446 of the base portion 460. As shown in FIGS. 16-22, the drain aperture 486 may be positioned generally along a drain axis D that is spaced away from but generally parallel to the central axis A of the funnel assembly 430. The drain axis D may be positioned to correspond with the lowest portion of the bottom wall 446, and may be positioned annularly outward of the central axis A. In various embodiments, the drainage aperture 486 may be positioned approximately half-way between the central axis A and the wall 434 of the funnel assembly 430. In other embodiments, the drainage aperture 486 may be positioned closer to the wall 434 than the central axis A. Other relative locations are envisioned herein for the offset drainage aperture 486. As illustrated in FIGS. 16 and 22, the aperture 486 may be offset from the center, positioned along a side, or in other locations as needed. Generally, the location of the drain opening is configured to provide an outlet through which the combined beverage making substance (e.g. powder 500) and water can flow after the beverage making substance is dissolved or at least partially integrated with the water.

In illustrative embodiments, a mesh material 488 is positioned over the drain aperture 486. The mesh 488 can be attached to or molded in the material forming the offset outlet structure 448 or bottom wall 446 to retain it in position over the drain aperture 486. While the mesh or other material 488 could be configured to be removable, a preferred embodiment is to integrally mold the mesh 488 in the outlet structure 448 material so that it can be, generally, permanently retained in the base portion 460. The material 488 is described as mesh but can be any variety of configuration of material that permits a dissolved beverage making substance in the water to flow through the drain aperture 486. In this regard, during the beverage making process the beverage making material has become at least partially dissolved and generally fluid allowing it to flow in solution with the water through the mesh material 488 and drain aperture 486.

The drain aperture 486 and mesh 488 are configured to allow fluids to pass therethrough but are sized and dimensioned to provide some restriction of particles and fluids there through. In addition, the openings formed in the mesh or grate material are sized and dimensioned to prohibit larger particles of the beverage making substance from flowing through the mesh (e.g. undissolved clumps of material 500). This helps promote the substantial integration of the beverage making substance ingredients into the water. The beverage making substance might be formed of ingredients including a sugar material or other natural, synthetic, or a combination of sweeteners and may include coloring ingredients, flavoring ingredients, sweetening ingredients and other ingredients providing other flavors or beverage characteristics. An ingredient may be included to provide a particular mouth feel of the resultant beverage once the ingredients have been mixed in the water.

The base portion 460, and funnel assembly 430 in general, is formed of a material that is compatible for use with food products. The materials can be chosen for its qualities in relation to the type of beverage making substance ingredients that will come in contact with the material surfaces. Additionally, the material can be chosen for its properties relative to the use and contact with hot water. The beverage making equipment that is used to produce this beverage typically will dispense hot water into the base portion 460. The hot water provides a preferred chemical reaction to dissolve, melt, or otherwise break down the beverage making substance materials to dissolve it and carry it in the water, or in other words suspend or integrate the beverage ingredients in solution. It is a generally well-known chemical principal that heated water has a greater capacity to maintain other ingredients in solution. As such, the preferred material could be selected for its food grade properties under these various conditions. One example of a possible material would be silicone that is suitable for use in such a food preparation environment. In other embodiments, the beverage making equipment may dispense cold or room temperature water or liquid into the base portion 460. In addition, it could be preferred to provide a material that generally does not retain flavor or color characteristics from batch to batch. This will help prevent flavor or color transfer from altering the desired resultant beverage results.

In illustrative embodiments, the upwardly-extending projection 420 is positioned along the bottom wall 446 of the base portion 460 and extends upward into the cavity 470, as illustrated in FIGS. 16-17 and 21-23. In an exemplary embodiment, the projection 420 may be diamond or fin-shaped to include a first side surface 466, a second side surface 468, and a front surface 472, as illustrated in FIGS. 16-17 and 21-23. The protrusion may further include an apex 480 where the first side surface 466, second side surface 468 and front surface 472 converge together, although other shapes or configurations are envisioned herein. The projection 420 may be co-molded into the bottom wall 446 of the funnel assembly 430 so as to form a corresponding indent or hole 478 on the bottom side of the funnel assembly 430. The projection 420 may be formed of various shapes or sizes, depending on the type of beverage making equipment in use or the shape and size of the powdered material 500. The present disclosure envisions that the protrusion may take alternative shapes and sizes and should not be restricted to the illustrative embodiment disclosed.

In illustrative embodiments, the projection 420 is configured to direct the flow of powdered substance 500 and/or liquid as they are introduced into or retained in the funnel assembly 430. Accordingly, a portion of the projection 420 is preferably located in alignment with the central axis A to receive powdered substance 500 as it is poured into the funnel assembly 430. In illustrative embodiments, the projection 420 is configured to direct the powdered substance 500 into one or more channels, such as first and second channels 474 and 476, positioned along the bottom wall 446 of the funnel assembly 430. For example, illustrated in FIGS. 16-17 and 21-23, the first and second side surfaces 468 of the protrusion are configured to be angled slightly to cause powdered substance to be directed into the first and second channels 474 and 476 that extend along the bottom wall 446 of the funnel 430. In other embodiments, there may be only one channel or more than two channels formed in the base portion 460 of the funnel 430.

The first and second channels 474 and 476 are configured to direct the flow of beverage components—e.g. powdered substance, liquid or a combination thereof—as they pass through the funnel assembly 430. As the bottom wall 446 is angled downward toward the drain opening 486, the channels direct the flow of such beverage components toward to the drain opening in a predetermined or pre-arranged manner. By restricting the flow path of the beverage components into the predetermined arrangements, the components will be subjected to more sluicing or mixing action as they a retained in the funnel before exiting through the drain aperture 486.

Figure 23:
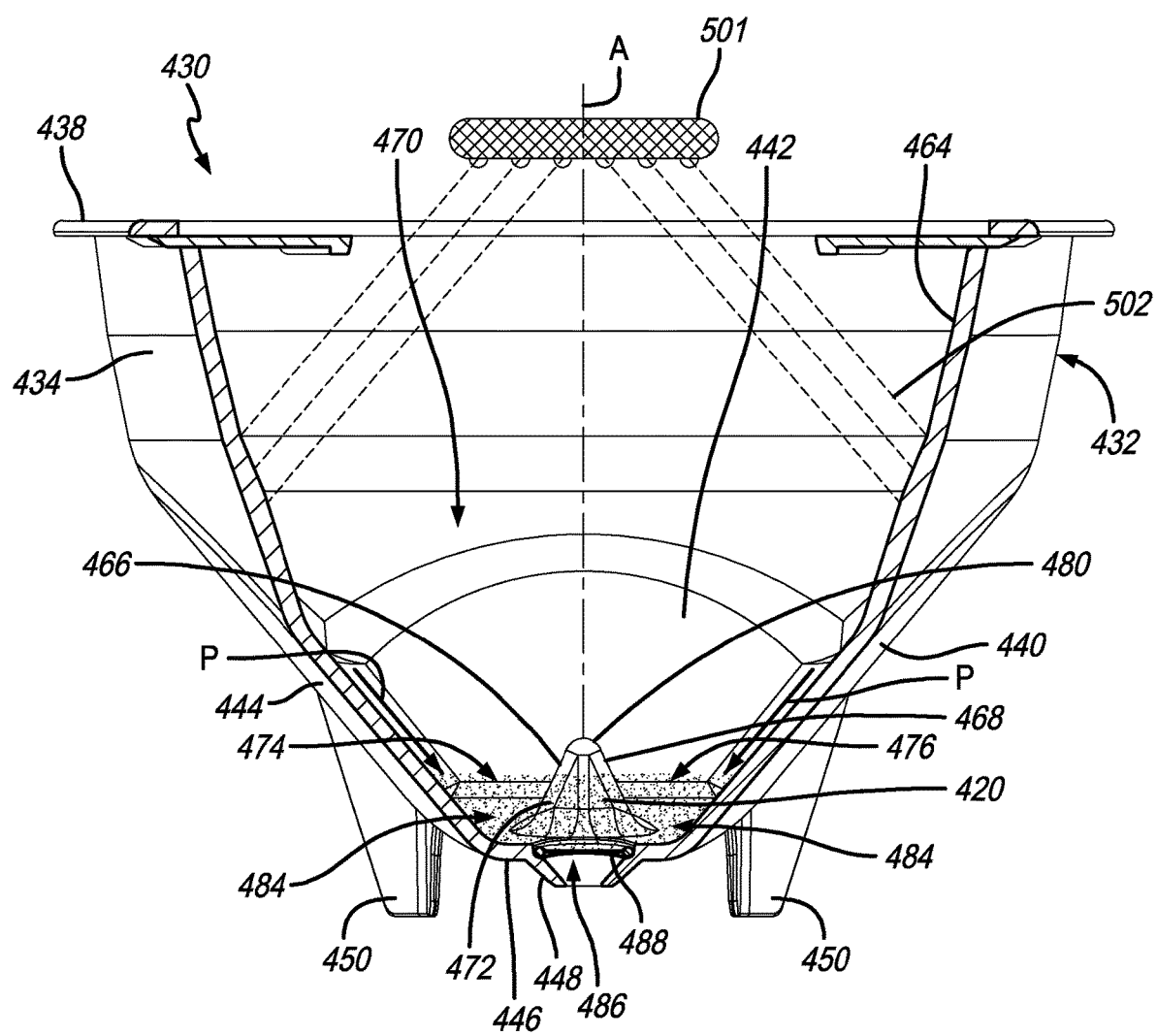
FIG. 23 is a view similar to the view of the funnel assembly taken along the line 23-23 in FIG. 17 and showing the cross section through a portion of the funnel assembly that generally corresponds with the offset outlet drain.
Figure 24A:
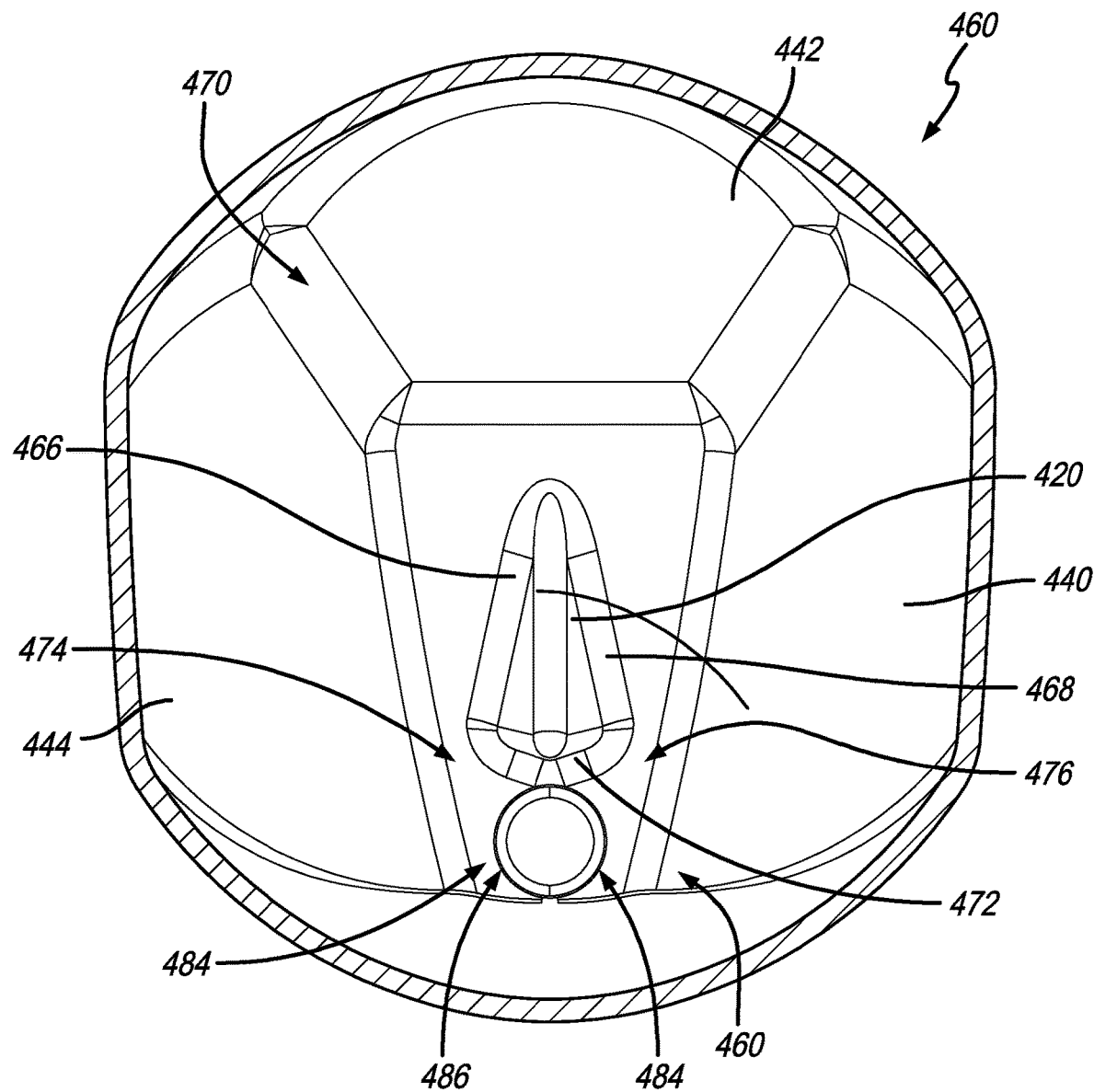
FIGS. 24A-24C are cross sectional views of the funnel body of the funnel assembly taken generally along the lines 24A-24A, 24B-24B, and 24C-24C of FIG. 15 and generally illustrating the shape and angle of the side walls of the funnel body at various points along the depth of the funnel body.
Figure 24B:
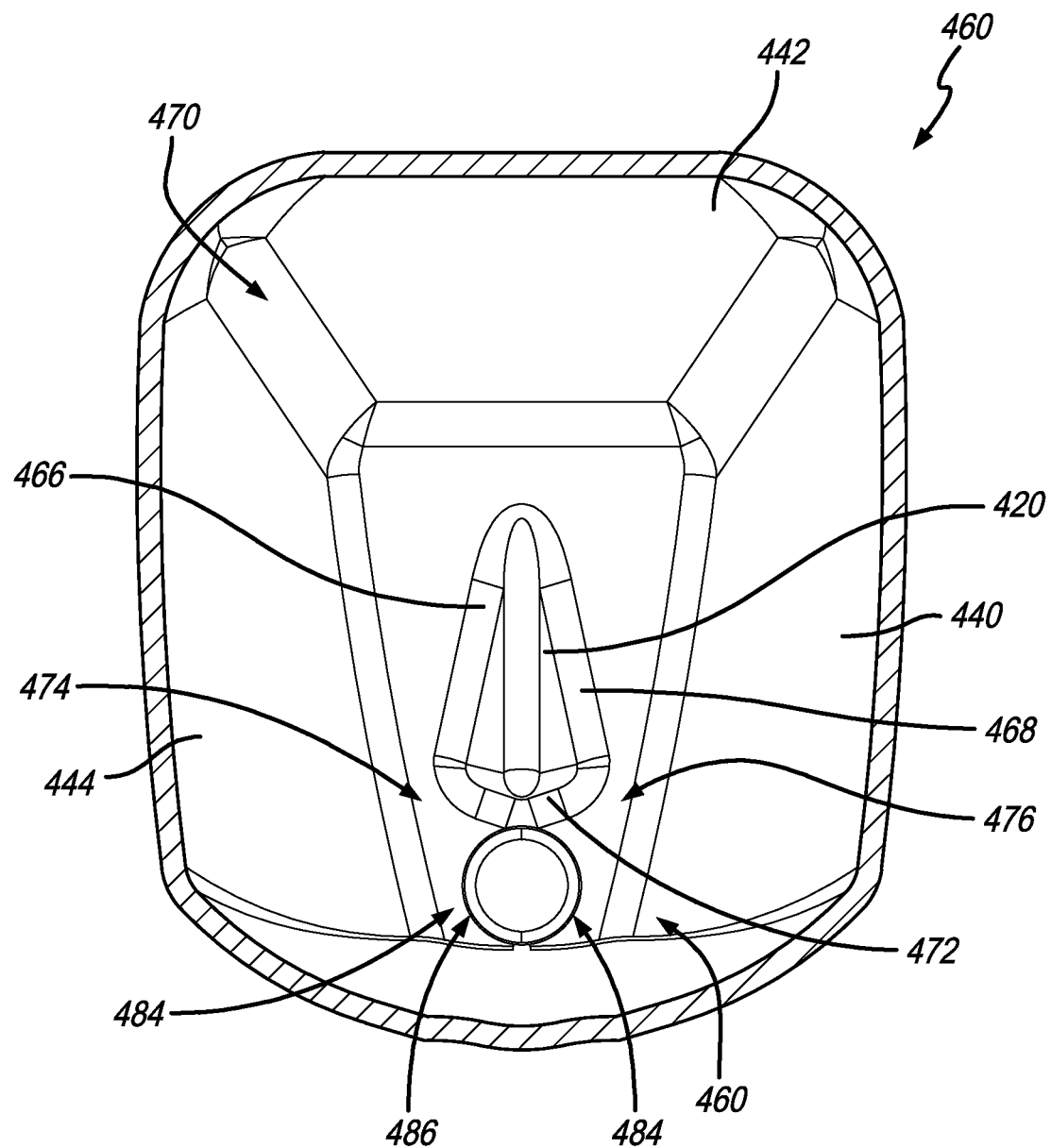
Figure 24C:
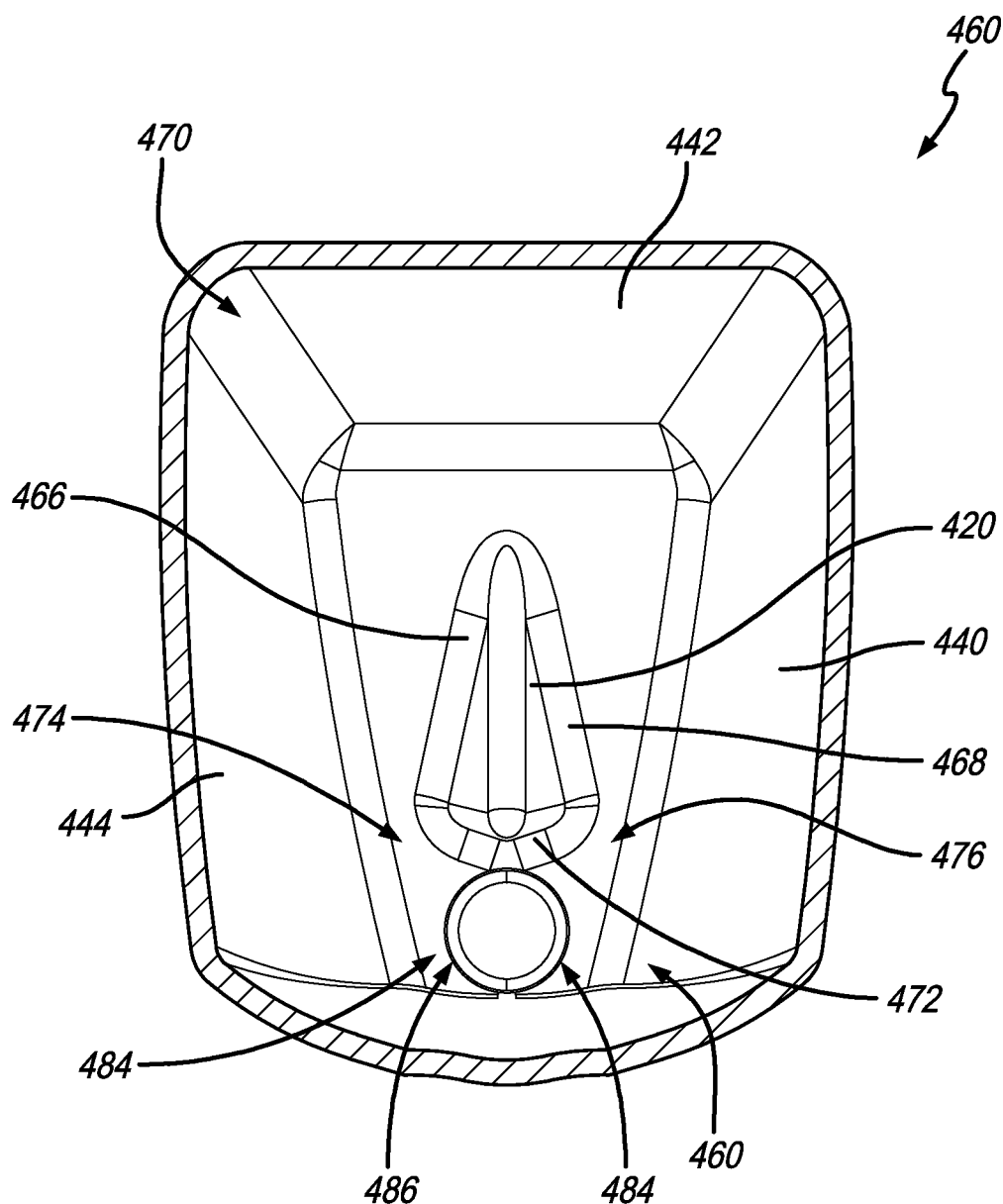

In illustrative embodiments, the first channel 474 is formed between the first side surface 466 of the projection 420 and the angled wall 444 of the annular wall 434 of the funnel assembly 430, as illustrated in FIGS. 21 and 23. Similarly, the second channel 476 is formed between the second side surface 468 of the protrusion and the angled wall 442 of the annular wall 434 of the funnel assembly 430. The first and second channels 474 and 476 extend down toward the drain aperture 486 along the angled bottom wall 446 to direct the flow of beverage components toward the drain aperture. As water or other liquid is sprayed into the funnel assembly 430, it will be directed to the angled walls 440, 442 and 444 and the force of gravity will cause the liquid to run down the side of the walls toward the channels 474 and 476, as noted in FIG. 23. By directing the flow of powdered substance 500 to the channels 474 and 476, the projection 420 provides a targeted location for the liquid to be directed in order to enhance the mixing process. Further, channels 474 and 476 provide a concentrated, predetermined location for mixing to occur.

In illustrative embodiments, the liquid being sprayed into the funnel assembly 430 may be sprayed at various velocities, depending on the type of beverage making equipment being used and the type of beverage being prepared. The angled walls 440, 442 and 444 are configured to be angled with respect to the annular wall 434 and/or the bottom wall 446 in order to ensure the velocity of the liquid as it hits the powdered material is suitable for the mixing required. For instance, the angled walls 440, 442 and 444 may increase the velocity of the liquid as it runs down the walls 440, 442 and 444 and into the channels 474 and 476, thereby increasing the force of the liquid as it mixes with the powdered substance 500 and providing for better mixing of the beverage components.

As illustrated in the exemplary embodiment in the Figures, the projection 420 is configured to at least partially restrict the flow or build-up of one or more beverage components from collecting directly on top of the mesh cover 488 of the drain aperture 486 when the beverage component is introduced or moved about within the funnel assembly 430. As noted above, a substantial build-up of powdered material 500, for instance, on top of the mesh cover 488 can cause undesired clumping action or block flow of a mixed beverage substance from the drain aperture 486. While a minimal amount of build-up of powdered material may not cause such clumping action, it has been found that too much powdered material directly on top of the mesh cover 488 may cause such undesired build-up and lead to blockage. Accordingly, in addition to directing flow of liquid and other material along the bottom wall 446 of the funnel assembly 430, the projection 420 is configured to create flow channels (e.g. flow channels 474 and 76) that substantially direct the flow of beverage components away from the drain aperture 486.

Figure 17:
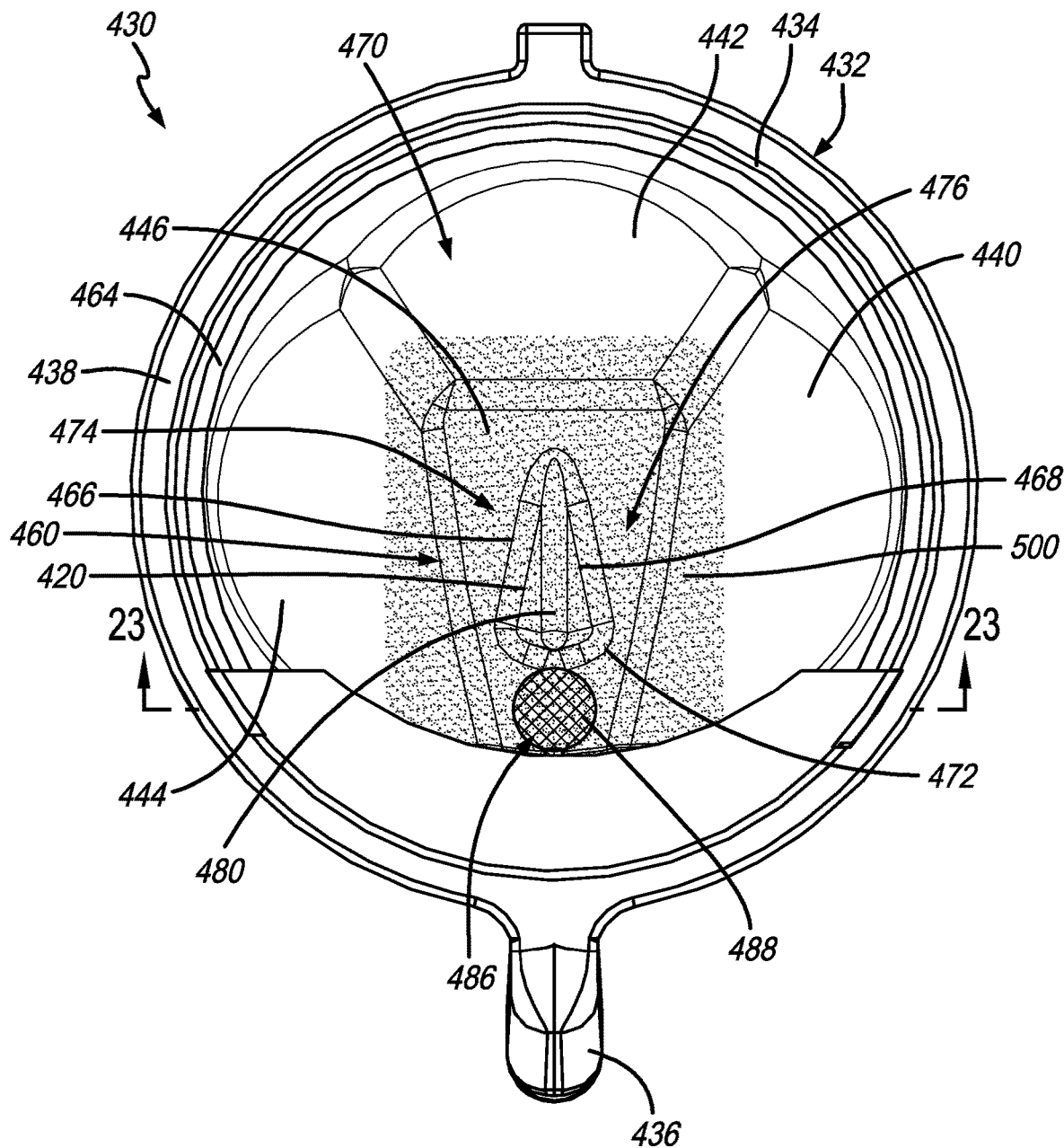
FIG. 17 is a view similar to the view of FIG. 16, illustrating the cavity has been partially filled with a powdered beverage making substance.

In various embodiments, the front surface 472 of the projection 420 is configured to be located adjacent the drain aperture 486 and is configured to shield or protect the drain aperture 486 from substantial build-up of powdered substance 500 thereon. As illustrated in FIGS. 17, 21 and 23, the powdered substance 500 will travel down the angled bottom wall 446 along channels 474 and 476 toward the drain opening 486, but the angle of the first and second side surface 466 and 468 will cause the powdered substance to be delivered to one or more pooling locations 484 that are adjacent to, but not over, the drain aperture 486. In various embodiments, the front surface 472 of the projection 420 extends between the first and second side surfaces 466 and 468, therein determining the distance between the flow channels 474 and 476. Accordingly, the front surface 472 may have a length that is generally as long as, or longer than, the diameter of the drain aperture 486. As the front surface 472 is positioned annularly inward and upstream from the drain aperture 486, the front surface 472 provides a blocking mechanism to the flow of powdered substance 500 onto the drain opening.

Turning to FIGS. 21, 22, and 23, cross-sectional views of the funnel 430 taken at various planes intersecting the drain axis D and the central axis A are show to further illustrate the base portion 460 of the funnel 430 and the flow path of beverage components therein. As powdered substance 500 is introduced into the funnel 430 along central axis A, it falls down and hits the projection 420. The angled side surfaces 466 and 468 of the projection 420 cause the powdered substance 500 to be directed into the flow channels 474 and 476, and the angle of the bottom wall 446 causes the substance 500 in the flow channels 474 and 476 to be directed down toward the pooling locations 484 that are adjacent to (but not on top of) the drain aperture 486. Accordingly, the drain aperture 486 and the mesh cover 488 over it receive substantially less powdered material 500 agglomerating over them. As liquid is introduced into the funnel assembly 430, it is also directed into the flow channels 474 and 476 and toward the pooling locations 484 to mix with the powdered material 500 before moving through the drainage aperture 486.

FIG. 23 includes a diagrammatic illustration of a spray head 501 of a beverage maker to distribute water 502 over a quantity of beverage making substance 500 to combine with the substance 500 to produce a beverage solution. The system is configured to promote a thoroughly mixed beverage solution to drain through the drain aperture 486 and the grate material 488 retained therein. The funnel assembly 430 is directed to improving efficient mixing and beverage components via, for example, the angled bottom wall 434 with the offset drain aperture 486, the projection 420 and the flow channels 474 and 476 partially formed by the projection 420 to direct the flow of beverage components around, but not on, the drain aperture, and the angled walls 440, 442 and 444 of the annular wall 434 of the funnel assembly 430 to direct liquid from a sprayhead to the channels 474 and 476 with sufficient force and direction to encourage mixing the powdered substance 500.

The proposed funnel assembly 430 as described herein provides the advantage of retaining the powdered beverage making substance in the cavity 470 of the assembly 430 for mixing with water to dissolve it and form a liquid beverage or liquid beverage making ingredient. If the powdered substance was placed directly into a typical brewing funnel, portions or particles of this substance might become attached, stuck to the inside surfaces of the funnel body, or lodged in acute areas such as the intersection between ribs, the wall, and an inside surface of a funnel bottom. This entrapment of beverage making substance particles could be undesirable since it could transfer flavor, coloration, or other characteristics to the next batch of beverage made in the funnel. Additionally, if this material is entrapped on the funnel surface it could attract or promote undesired organisms that could grow on the remaining nutritional components of the particles. For example, if the beverage making substance includes sugar or other organic flavorings this material could provide a food source for the growth of such organisms. Alternatively and as noted above, the powdered substance may clump or build up on top of the drain aperture 486 or its mesh cover 488 in an undesired way if there is a significant amount of powdered substance built up, and the water may simply pool on top of the clump instead of dissolve the powdered substance. Therefore, the use of the proposed funnel assembly 430 as described herein eliminates or at least reduces these issues.

In various embodiments, as the offset drainage aperture 486 will be located along a portion of the bottom wall 446 that is angled, water or other liquid will naturally run towards the lowest point of the base portion 460, adjacent the drain axis D. Accordingly, as powder sits adjacent or around the offset drainage aperture 486, the powder will be subjected to more "sluicing" action from the liquid being drawn downward down from central axis A toward the drain axis D. In such a manner, the powder that is located adjacent the offset drainage aperture 486 may receive more thorough mixing and agitation or incorporation of the dry product into the liquid. Contrarily, however, any powder in the lowest portion of the bottom wall 446 may experience a pooling effect, wherein water or other liquid simply pools above and around the powder instead of washing it along the angled portion of the bottom wall 446. The proposed design reduces this undesired effect, as described herein.

In various embodiments, the base portion 460, including the angled bottom wall 446 and the projection 420 and the offset drainage aperture 486, is configured in order to help avoid pooling and great more agitation and mixing action to reduce or eliminate any powder or dry remnant. In various embodiments, for example, the projection 420 and channels 474 and 476 may be configured to maximize control and influence over the liquid motion during a brewing or mixing operation to avoid pooling, create sluicing, and/or maximize incorporation of all powder in the finished beverage. In other embodiments, the angles X and Y of the angled walls 440, 442 and 444 can permit efficient mixing and optimize the interaction of liquid and powdered substances when the velocity of a spray head 501 may be lower than desired (for instance, when using a tea brewer that has a lower velocity spray head).

In use, a beverage making apparatus can be used to produce a beverage which may not include freshly ground coffee or tea particles but may be comprised primarily of one or more ingredients including flavorings, sweeteners, colorants, aroma ingredients, ingredients to produce a desired texture as well as other ingredients to produce a resultant beverage. The funnel assembly 430 has been produced to fit in a relatively conforming configuration with standard beverage making equipment. When making a batch of beverage using a powdered or granular material, the beverage making substance 500 can be placed in the cavity 470 by pouring the material 500 into the funnel assembly 430 past the rim 438. Specifically, the substance 500 may be poured into the cavity 470 along or adjacent to the central axis A, causing the powdered substance 500 to fall to the base portion 460 and be partially directed to specific locations in the base portion 460 by the projection 420. The funnel 430 is then positioned in the brewer for receiving water 502 from the spray head 501. The water 502 is sprayed such that it will hit the inside surface 464 of the wall 434 of the funnel assembly 430 and then travel down the angled walls (440, 442 and 444) along a flow path P to the base portion 460, where it will be mixed with the substance 500 retained in the channels 474 and 476 along either side of the projection 420. Once the water contacts the beverage making substance it tends to become dissolved in this water and ingredient mixture. The liquid portion of the dissolved combined beverage ingredient and water flows out of the funnel 430 through the drain opening 486 and mesh or grate material 488.

In various embodiments, the funnel assembly 430 may further be modified to optimize a filter-less tea or coffee brewing operation, as is known in the industry. Other forms of modifying funnel assembly 430 to permit production of various beverages or liquids are envisioned within the scope of this disclosure.

In one preferred configuration, the volume of the base portion 460 is sized and dimensioned to receive the volume of beverage making substance for producing a batch of beverage. The volume should be compatible also to receive at least a portion of the water to be used in the mixing and dissolving of the beverage making substance generally to retain the entire volume of the mixture within the base portion 460 during the beverage making process. During a preferred embodiment of the beverage making process, a separate quantity of water can be controllably dispensed by the beverage making apparatus into the receiving container. In other words, the receiving container positioned under the outlet structure 448 receives the liquid beverage ingredients from the funnel assembly as well as a separate volume of dilution water for mixing with the beverage ingredients. The dilution water can be at ambient or reduced temperature to help promote the cooling of the beverage produced with the funnel. As such, the use of multiple doses of water for different purposes during this beverage making process can be optimized to produce a consistent resultant beverage concentrate that is diluted with water. By dispensing the dilution water continuously during the process for combination with the concentrate, a generally consistent beverage can be produced which is ready to drink after the beverage making process is completed. It is believed that the combination of the concentrate with the dilution water results in a generally consistent mixing and a generally consistent brix measurement throughout the volume of produced beverage collected in the container below the funnel.

As mentioned, the volume of the base portion 460 is generally sized and dimensioned to receive most or all of the beverage making substance and at least a portion of the beverage mixing water from the spray head. It is recognized that the mixing water will generally be controllably dispensed in a stream, pulses of water, or any combination of stream, pulses, and/or pauses over a predetermined period of time. Since some of the beverage material will readily dissolve with this water, some of the beverage making material dissolved in solution will flow out through the drain. As such, a calculation can be made to determine the inflow of water and the outflow of beverage concentrate for use in calculating the volume that should be used with a particular beverage making substance.

Also disclosed is the process as described for producing a beverage using a funnel assembly, dissolvable beverage making substance, and a liquid to create a beverage concentrate or liquid beverage ingredient for subsequent controlled mixing or dilution with a predetermined volume of water or other beverage ingredient. Alternatively, the liquid beverage ingredient could be dispensed over quantity of ice or into a container with reduced temperature water already provided in the container.

While it might be preferred in some situations to utilize the dilution functions of a beverage making apparatus, the funnel assembly can be used in a more simplified version that does not provide for dilution. As a result, the concentrate would be dispensed over the ice melting the ice, thereby reducing the temperature of the concentrate while it is mixed with the ice, and melting the ice so that the final ready to drink beverage is at a desired temperature and a desired diluted concentration to achieve the ready to drink beverage end product.

We claim:

1. A funnel assembly for use in a beverage brewing apparatus, the funnel assembly comprising:
 a funnel having a body portion and a bottom portion, the body portion including an annular wall forming an inside surface that at least partially defines an interior cavity, the bottom portion including one or more ribs protruding upwardly into the interior cavity, the funnel having a funnel opening in a lower portion of the funnel; and
 an insert receivable within the interior cavity of the funnel, the insert including a base and formed to include an insert cavity configured to at least partially retain a food ingredient deposited therein for mixing with a dilution ingredient introduced therein to combine and at least partially integrate the food ingredient and dilution ingredient, the base including a drainage aperture that is offset relative to the funnel opening and permits a fluid to flow through the insert;
 a flow guide extending from a bottom exterior surface of the base proximate the drainage aperture of the insert, the flow guide directing flow of fluid from the drainage aperture of the insert into the interior cavity of the funnel away from the funnel opening to facilitate further mixing of the food ingredient and dilution ingredient.

2. The assembly of claim 1, wherein the drainage aperture is offset from a central axis of the insert.

3. The assembly of claim 2, wherein the drainage aperture is approximately half-way between the central axis and an annular wall of the insert.

4. The assembly of claim 1, wherein a mesh grating is disposed within the drainage aperture.

5. The assembly of claim 1, wherein the funnel further includes a rim and wherein a portion of the insert engages with the rim to retain the insert within the interior cavity of the funnel.

6. The assembly of claim 5, wherein the rim includes one or more apertures that receive a portion of the insert to retain the insert within the interior cavity of the funnel.

7. The assembly of claim 1, wherein the insert further includes a second drainage aperture that permits a fluid to flow through the insert, and wherein the drainage aperture is positioned to align with a central axis of the insert and the second drainage aperture is positioned annularly outward of the central axis.

8. The assembly of claim 7, wherein a mesh grating is disposed within at least one of the drainage aperture and the second drainage aperture.

9. The assembly of claim 1, wherein the funnel further includes an outlet structure coupled to the bottom portion, the outlet structure providing a flow path of fluid flowing out of the assembly and defining a slot for receiving fluid.

10. The assembly of claim 9, wherein the drainage aperture of the insert is positioned above the slot of the outlet structure.

11. The assembly of claim 10, wherein the drainage aperture is offset from a central axis of the insert and positioned to drain fluid into the slot of the outlet structure.

12. The assembly of claim 11, wherein the insert includes one or more positioning features on a bottom surface of the base of the insert that prevents positioning the insert within the interior cavity of the funnel if the drainage aperture is not positioned above the slot in the outlet structure.

13. The assembly of claim 1, wherein the insert is at least partially conically shaped.

14. The assembly of claim 13, wherein the insert extends substantially from a top of the funnel to the bottom portion of the funnel.

15. The assembly of claim 1, wherein the bottom portion of the funnel includes two or more ribs, the two or more ribs spaced apart to form one or more channels therebetween, and wherein at least a portion of the base of the insert is configured to abut against one or more of the ribs.

16. The assembly of claim 1, wherein the insert cavity of the insert is configured to retain a powdered beverage substance to be mixed within the insert.

17. The assembly of claim 1, wherein the bottom portion of the funnel includes two or more ribs, the two or more ribs being spaced apart to form one or more channels therebetween, and wherein the insert prevents the beverage-making substance from entering the channels.

18. The assembly of claim 1, wherein the insert includes a rim that is formed to include one or more grooves, the grooves open to a top mouth of the body portion of the funnel to provide a flow path for liquid from the beverage brewing apparatus to travel to bottom portion of the funnel without entering the insert when the insert is retained in the funnel.

19. The assembly of claim 1, wherein the insert further includes a liquid shield that engages with a portion of the inside surface of the funnel or a rim of the funnel.

20. The assembly of claim 19, wherein the liquid shield includes one or more connection tabs that engage with the rim of the funnel to retain the insert within the interior cavity of the funnel.

21. The assembly of claim 19, wherein the liquid shield is positioned adjacent a handle of the funnel.

22. The assembly of claim 1, wherein the insert further includes one or more handles connected to the body portion, and wherein the one or more handles are spaced away from the inside surface of the funnel when the insert is located within the cavity of the funnel.

23. The assembly of claim 1, wherein the insert includes an outside surface that is configured to at least partially engage with the inside surface of the funnel.

* * * * *